US007881387B2

(12) United States Patent
Han et al.

(10) Patent No.: US 7,881,387 B2
(45) Date of Patent: Feb. 1, 2011

(54) APPARATUS AND METHOD FOR ADJUSTING BITRATE OF CODED SCALABLE BITSTEAM BASED ON MULTI-LAYER

(75) Inventors: Woo-jin Han, Suwon-si (KR); Kyo-hyuk Lee, Seoul (KR); Sang-chang Cha, Hwaseong-si (KR); Ho-jin Ha, Seoul (KR); Bae-keun Lee, Bucheon-si (KR); Jae-young Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1506 days.

(21) Appl. No.: 11/251,976

(22) Filed: Oct. 18, 2005

(65) Prior Publication Data
US 2006/0083303 A1 Apr. 20, 2006

Related U.S. Application Data

(60) Provisional application No. 60/619,023, filed on Oct. 18, 2004.

(30) Foreign Application Priority Data
Dec. 17, 2004 (KR) .............. 10-2004-0107960

(51) Int. Cl.
H04N 7/12 (2006.01)
H04N 11/02 (2006.01)
H04N 11/04 (2006.01)
(52) U.S. Cl. ............................. 375/240.25
(58) Field of Classification Search ............ None
See application file for complete search history.

(56) References Cited

U.S. PATENT DOCUMENTS
5,416,521 A * 5/1995 Chujoh et al. ........ 375/240.14

(Continued)

FOREIGN PATENT DOCUMENTS
KR 2002-0081973 A 10/2002

(Continued)

OTHER PUBLICATIONS
M. Van Der Schaar, et al., ISO/IEC JTC1/SC29/WG11, "Description of Core Experiments in MPEG-21 Scalable Video Coding," MPEG Document N6521, Redmond, Jul. 2004.

(Continued)

Primary Examiner—Yuzhen Ge
(74) Attorney, Agent, or Firm—Sughrue Mion, PLLC

(57) ABSTRACT

Disclosed are a method and an apparatus for realizing signal to noise ratio (SNR) scalability in a video stream server in order to transmit a video stream in a variable network environment. An apparatus for adapting a bitrate of a coded scalable bit-stream based on multi-layers to a variable network environment, comprising a bit-stream parsing unit to parse an input bit-stream, a pre-decoding condition determining unit to determine a target transmission bitrate according to the variable network environment, a pre-decoding unit to skip at least one frame among the frames included in the parsed bit-stream according to the determined target transmission bitrate, and a bit-stream transmission unit to transmit to a client device the bit-stream that has been restructured due to frame skipping.

20 Claims, 17 Drawing Sheets

U.S. PATENT DOCUMENTS

| | | | |
|---|---|---|---|
| 5,754,241 A * | 5/1998 | Okada et al. | 375/240.05 |
| 6,529,552 B1 | 3/2003 | Tsai et al. | |
| 6,639,943 B1 | 10/2003 | Radha et al. | |
| 6,795,498 B1 * | 9/2004 | Kato et al. | 375/240.01 |
| 7,068,718 B2 * | 6/2006 | Kim et al. | 375/240.02 |
| 7,095,782 B1 * | 8/2006 | Cohen et al. | 375/240.01 |
| 7,203,238 B2 * | 4/2007 | Liu et al. | 375/240.17 |
| 7,272,299 B2 * | 9/2007 | Notoya et al. | 386/95 |
| 7,317,759 B1 * | 1/2008 | Turaga et al. | 375/240.01 |
| 2002/0071654 A1 * | 6/2002 | Notoya et al. | 386/65 |
| 2002/0118742 A1 | 8/2002 | Puri et al. | |
| 2003/0002579 A1 | 1/2003 | Radha et al. | |
| 2005/0008240 A1 * | 1/2005 | Banerji et al. | 382/238 |

FOREIGN PATENT DOCUMENTS

| | | |
|---|---|---|
| KR | 2004-62733 A | 7/2003 |
| KR | 2004-47010 A | 6/2004 |
| WO | WO 03/023785 A2 | 3/2003 |
| WO | 03/036983 A2 | 5/2003 |
| WO | WO 03/036978 A1 | 5/2003 |
| WO | WO 03/098938 A2 | 11/2003 |
| WO | 2006/006777 A1 | 1/2006 |

OTHER PUBLICATIONS

H. Schwarz, et al., "Scalable Extension of H.264/AVC," M10569, Munich, Mar. 2004.

Woo-Jin Han, et al., "Responses of CE1d: Base-Layer", MPEG Document M11055, Redmond, Jul. 2004.

K. Hanke, "Response to SVC CE1e—Spatial Highpass Transition Filtering," ISO/IEC JTC1/SC29/WG11, MPEG doc. M11011, Redmond, Jul. 2004.

Woo-Jin Han, et al., "Responses of CE1e: Deblocking", MPEG Document M11056, Redmond, Jul. 2004.

Wonha Kim, et al., "Interframe Wavelet Video Coding with Frame Adaptive Spatial Wavelet," MPEG Document M10323, Hawaii, Jul. 2004.

Yusuf, A.A., et al., "An Adaptive Motion Vector Composition Algorithm for Frame Skipping Video Transcoding," IEEE MELECON, May 12-15, 2004, p. 235-238, vol. 1, IEEE, Piscataway, NJ, USA.

* cited by examiner

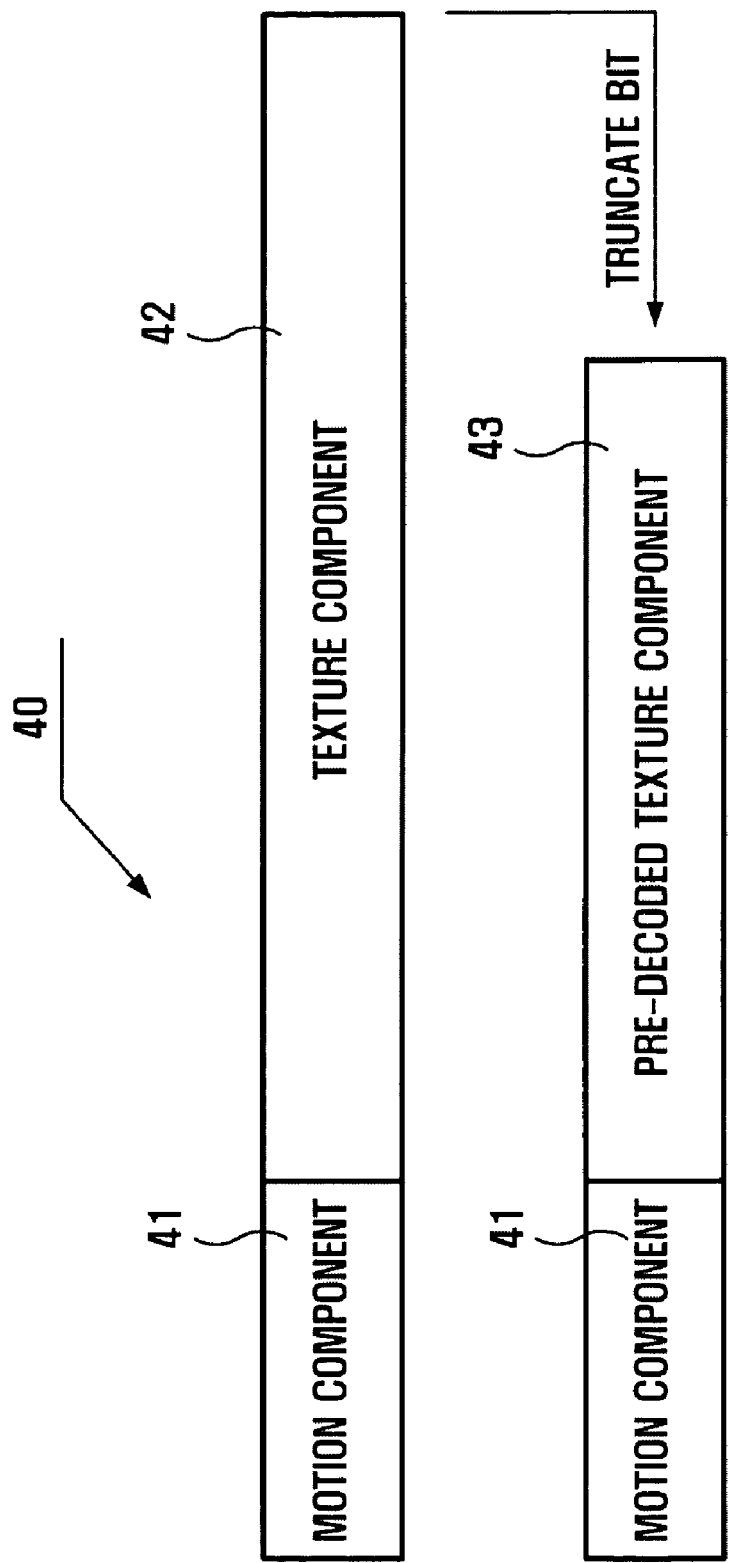

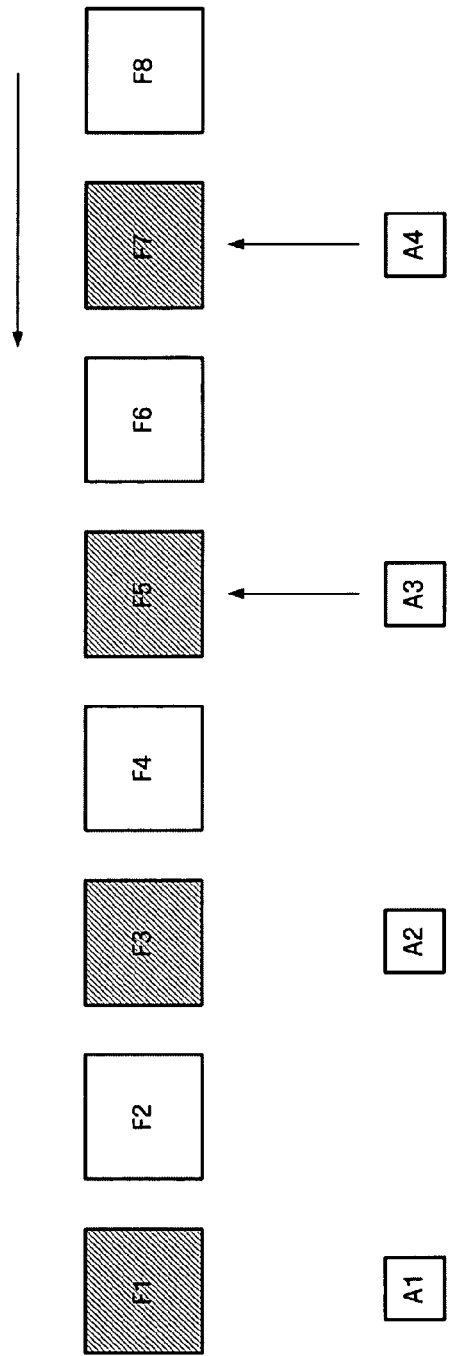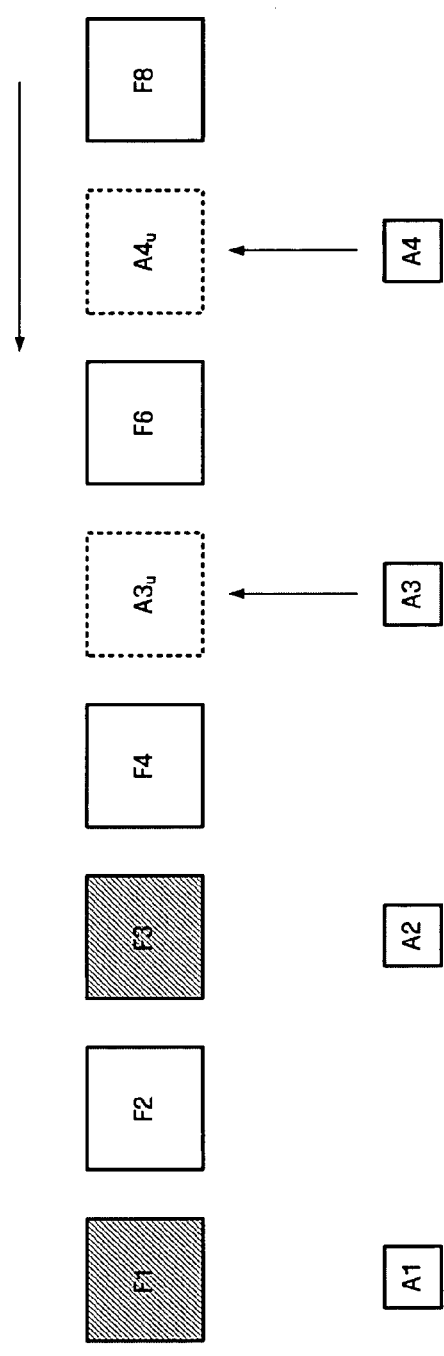

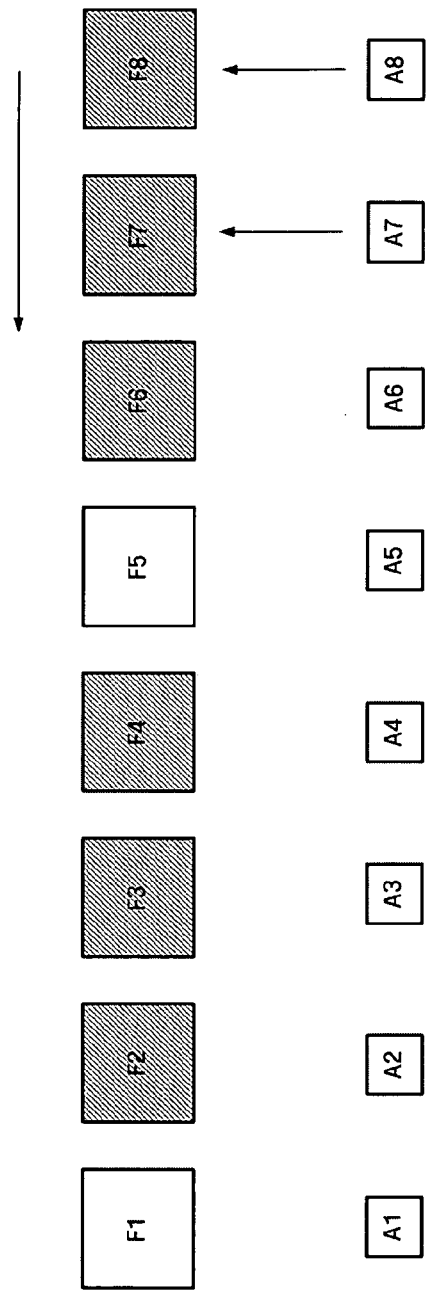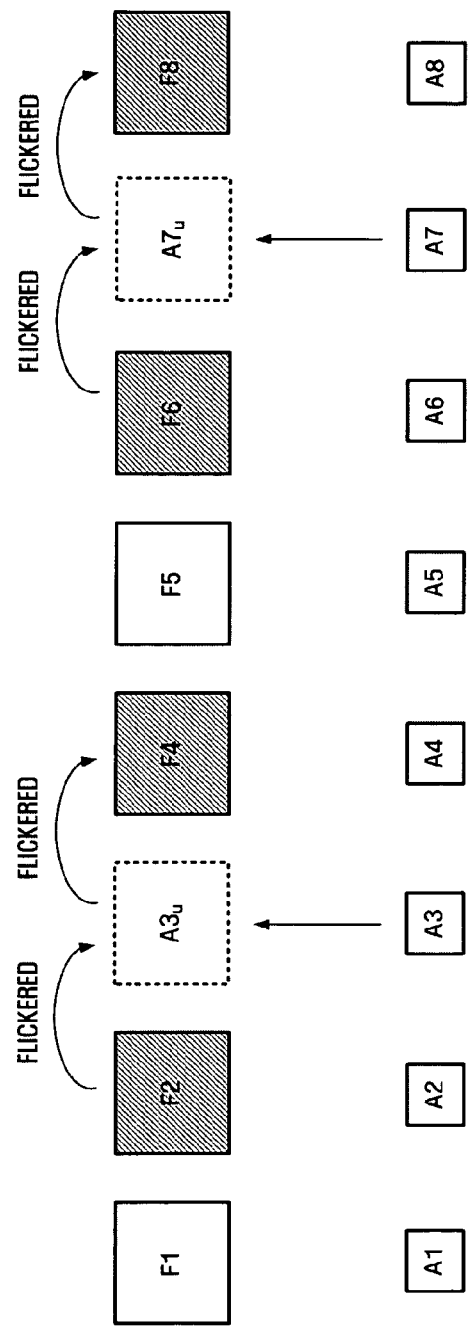

AXIS OF TIME

AXIS OF TIME

APPARATUS AND METHOD FOR ADJUSTING BITRATE OF CODED SCALABLE BITSTEAM BASED ON MULTI-LAYER

CROSS-REFERENCE TO RELATED APPLICATIONS

This application claims priority from Korean Patent Application No. 10-2004-0107960 filed on Dec. 17, 2004 in the Korean Intellectual Property Office, and U.S. Ser. No. 60/619,023 filed on Oct. 18, 2004 in the United States Patent and Trademark Office, the disclosures of which are incorporated herein in their entireties by reference.

BACKGROUND OF THE INVENTION

1. Field of the Invention

Apparatuses and methods consistent with the present invention relate to video compression. More particularly, the present invention relates to a method and an apparatus for realizing signal to noise ratio (SNR) scalability in a video stream server in order to transmit a video stream in a variable network environment.

2. Description of the Related Art

Development of communication technologies such as the Internet has led to an increase in video communication in addition to text and voice communication. However, consumers have not been satisfied with existing text-based communication schemes. To satisfy various consumer needs, services for multimedia data containing text, images, music and the like have been increasingly provided. Multimedia data is usually voluminous and requires a large capacity storage medium. Also, a wide bandwidth is required for transmitting the multimedia data. For example, digitizing one frame of a 24-bit true color image with a resolution of 640×480 requires 640×480×24 bits, that is, 7.37 mega bits (Mbits). Accordingly, a bandwidth of approximately 221 Mbits per second is needed to transmit this data at the rate of 30 frames per second, and a storage space of approximately 1,200 giga bits (Gbits) is needed to store a 90-minute movie. Taking this into consideration, it is required to use a compressed coding scheme when transmitting multimedia data.

A basic principle of data compression is to eliminate redundancy in the data. The three types of data redundancy are: spatial redundancy, temporal redundancy, and perceptual-visual redundancy. Spatial redundancy refers to the duplication of identical colors or objects in an image, temporal redundancy refers to little or no variation between adjacent frames in a moving picture or successive repetition of the same sounds in audio, and perceptual-visual redundancy refers to the limitations of human vision and the inability to hear high frequencies. By eliminating these redundancies, data can be compressed. Data compression types can be classified into loss/lossless compression depending upon whether source data is lost, intraframe/interframe compression depending upon whether data is compressed independently relative to each frame, and symmetrical/asymmetrical compression depending upon whether the same amount of time is taken to decompress as it is to compress. In addition, when a total end-to-end delay time in compression and decompression does not exceed 50 ms, this is referred to as real-time compression. When frames have a variety of resolutions, this is referred to as scalable compression. Lossless compression is mainly used in compressing text data or medical data, and lossy compression is mainly used in compressing multimedia data. Intraframe compression is generally used for eliminating spatial redundancy and interframe compression is used for eliminating temporal redundancy.

Transmission media to transmit multimedia data have different capacities. Transmission media in current use have a variety of transmission speeds, covering ultra-high-speed communication networks capable of transmitting data at a rate of tens of Mbits per second, mobile communication networks having a transmission speed of 384 kilo bits (Kbits) per second and so on. In conventional video encoding algorithms, e.g., MPEG-1, MPEG-2, MPEG-4, H.263 and H.264 (Advanced Video Coding), temporal redundancy is eliminated by motion compensation, and spatial redundancy is eliminated by spatial transformations. These schemes have good performance in compression but they have little flexibility for a true scalable bit-stream because main algorithms of the schemes employ recursive approaches.

For this reason, research has been focused recently on wavelet-based scalable video coding. Scalable video coding refers to video coding having scalability in a spatial domain, that is, in terms of resolution. Scalability has the property of enabling a compressed bit-stream to be decoded partially or in advance, whereby videos having a variety of resolutions can be played.

The term "scalability" herein is used to collectively refer to spatial scalability for controlling the resolution of a video, signal-to-noise ratio (SNR) scalability for controlling the quality of a video, and temporal scalability for controlling the frame rates of a video, and combinations thereof.

As described above, the spatial scalability may be implemented based on the wavelet transformation. Also, temporal scalability has been implemented using motion compensated temporal filtering (MCTF) and unconstrained MCTF (UM-CTF). SNR scalability may be implemented based on the embedded quantization coding scheme that considers spatial correlation or on the fine granular scalability (FGS) coding scheme used for MPEG series codecs.

An overall construction of a video coding system to support scalability is depicted in FIG. 1. A video encoder 45 encodes an input video 10 through temporal filtering, spatial transformation, and quantization to thereby generate a bit-stream 20. A pre-decoder 50 may implement a variety of scalabilities relative to texture data in a simple manner by truncating or extracting a part of the bit-stream 20 received from the video encoder 45. Picture quality, resolution or frame rate may be considered for the truncating. The process of implementing the scalability by truncating a part of the bit-stream is called "pre-decoding."

The video decoder 60 reconstructs the output video 30 from the pre-decoded bit-stream 25 by inversely performing the processes conducted by the video encoder 45. Pre-decoding of the bit-stream according to pre-decoding conditions is not necessarily conducted by the pre-decoder 50. When it is difficult to process the whole video of the bit-stream 20 generated at the video encoder 45 side in real time because of insufficient processing capability of the video encoder 60, the bit-stream may be pre-decoded at the video decoder 60 side.

Standardization with respect to video coding technologies to support scalability is under development in the moving picture experts group-21 (MPEG-21) PART-13. Especially, there have been many attempts to implement multi-layered video coding methods. A multi-layer may comprise a base layer, a first enhancement layer and a second enhancement layer, and each layer has different resolutions (QCIF, CIF 2CIF) or different frame rates.

FIG. 2 illustrates an example of a scalable video codec using a multi-layer structure. A base layer is defined in the quarter common intermediate format (QCIF) having a frame rate of 15 Hz, a first enhancement layer is defined in the common intermediate format (CIF) having a frame rate of 30 Hz, and a second enhancement layer is defined as a standard definition (SD) having a frame rate of 60 Hz. When a stream of CIF 0.5M is required, the bit-stream of the first enhancement layer (CIF-30 Hz@0.7M) can be pre-decoded. In this manner, spatial, temporal and SNR scalabilities may be implemented. Since there exist similarities between textures and motion vectors of each layer, redundancies of each layer are generally removed when encoding a plurality of layers. The layers illustrated in FIG. 2 have different resolutions and frame rates. However, there may exist layers having the same resolution but different frame rates, or having the same frame rate but different resolutions.

A conventional method to implement the SNR scalability at the pre-decoder 50 side is as illustrated in FIG. 3. A bit-stream 20 generated by a video encoder consists of a plurality of group of pictures (GOPs), and each GOP consists of a plurality of frame information. Frame information 40 consists of a motion component 41 and a texture component 42. The pre-decoder 50 determines a transmissible bitrate according to the bandwidth of the network connected to the decoder side, and truncates a part of the original texture component 42 based on the determined bitrate. The texture component left after truncating the original texture component 42, that is, the texture component 43 pre-decoded based on the SNR, and the motion component 41 are transmitted to the video decoder side.

Since this texture component is encoded by a method to support SNR scalability, the SNR scalability can be implemented by a simple operation to truncate a part of the texture component backward. Encoding methods to support SNR scalability are: fine granular scalability (FGS) coding used in codecs of the MPEG series, and embedded quantization coding used in codecs of the wavelet series. The bit-stream generated by the embedded quantization has an additional merit: it can be pre-decoded finer than the bit-stream generated by the FGS coding.

However, because of overhead due to the motion information and a structural problem of multi-layered video coding, the bit-stream may not approach a target bitrate desired by a user when the SNR changes in a layer. In this case, if the quality of the picture is degraded because of excessive truncation of data or the bit-stream is transmitted as it is because there is no bit to be further truncated, this may cause a network delay in real-time streaming. Therefore, there is a need for a pre-decoding method to solve this problem.

SUMMARY OF THE INVENTION

The present invention has been proposed to solve the problem described above, and an object of the present invention is to provide a pre-decoding method and apparatus capable of coping adaptively with a variable network environment.

Another object of the present invention is to solve a problem that a bit-stream cannot approach a target transmission bitrate only by truncating texture information of a frame in the current layer.

According to an aspect of the present invention, there is provided an apparatus for adapting a bitrate of a coded scalable bit-stream based on multi-layers to a variable network environment, comprising a bit-stream parsing unit to parse an input bit-stream, a pre-decoding condition determining unit to determine a target transmission bitrate according to the variable network environment, a pre-decoding unit to skip at least one frame among the frames included in the parsed bit-stream according to the determined target transmission bitrate, and a bit-stream transmission unit to transmit to a client device the bit-stream that has been restructured due to frame skipping.

According to another aspect of the present invention, there is provided a multi-layer based video decoder comprising a skip confirmation unit to confirm skipping of the current frame by reading out a value of the field that indicates the texture data size of the current frame from an input bit-stream, a base layer decoder to restore a base layer frame having the same temporal position as the current frame when the value indicates frame skipping, and a upsampling unit to upsample the restored lower layer frame to the resolution of an enhancement layer.

According to a further another aspect of the present invention, there is provided a method of adapting a bitrate of a coded scalable bit-stream based on multi-layers to a variable network environment, comprising parsing an input bit-stream, determining a target transmission bitrate according to the variable network environment, skipping at least one frame among the frames included in the parsed bit-stream according to the determined target transmission bitrate, and transmitting to a client device the bit-stream that has been restructured after the frame skipping.

According to a still further another aspect of the present invention, there is provided a multi-layer based video decoding method comprising confirming skipping of the current frame by reading out a value of the field that indicates the texture data size of the current frame from an input bit-stream, restoring a base layer frame having the same temporal position as the current frame when the value indicates frame skipping, and upsampling the restored lower layer frame to the resolution of an enhancement layer.

BRIEF DESCRIPTION OF THE DRAWINGS

The above and other features and advantages of the present invention will become more apparent by describing in detail preferred embodiments thereof with reference to the attached drawings in which:

FIG. 3 illustrates conventional implementation of SNR scalability;

FIGS. 4 to 7 illustrate frame skipping according to an exemplary embodiment of the present invention;

DETAILED DESCRIPTION OF EXEMPLARY EMBODIMENTS

Figure 1:
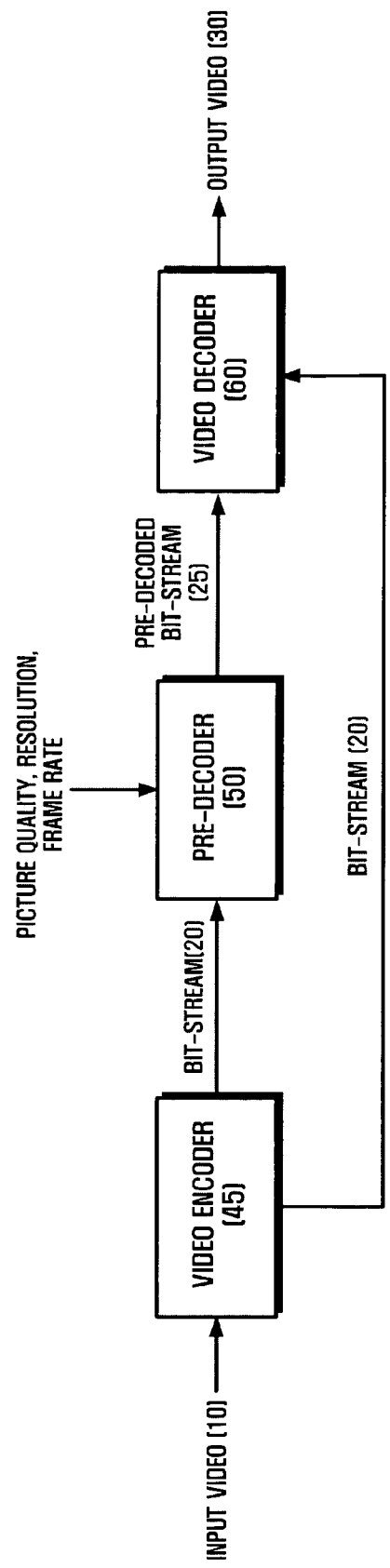
FIG. 1 illustrates the overall construction of a video coding system to support scalability.

Hereinafter, exemplary embodiments of the present invention will be described in detail with reference to the accompanying drawings. Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

In the present invention, a special method is used to implement SNR scalability when a bit-stream cannot reach a target transmission bitrate at the pre-decoder side even by truncating a texture component of the bit-stream encoded using multi layers. In this case, the pre-decoder skips a frame in the current layer, and a decoder restores the frame of the current layer, using a frame of a base layer corresponding to the frame of the current layer. This technology extends the scope of scalability, saves bits of the skipped frame, and provides a video frame superior in visual quality, rather than restoring a part of the current layer frame because of insufficient bitrate.

The frame skipping used in the present invention will be described with reference to FIGS. 4 to 7. It is assumed that there is a bit-stream comprising a plurality of base layer frames (A1 to A4) and a plurality of enhancement layer frames (F1 to F8). An enhancement layer frame, (i.e., F1) can be restored by upsampling the base layer (i.e., A1) in the same temporal position at the decoder side even though a part thereof is truncated. In the example of FIG. 4, frames F1, F3, F5 and F7 are truncated. When the bit-stream cannot reach the target transmission bitrate by pre-decoding the bit-stream, the pre-decoder may skip a part or the entire enhancement layer frame in which a base layer frame is present at the same position. The sequence of skipping starts from the last frame of the current pre-decoding unit in an inverse manner. In FIG. 5, when there is a need to skip two frames, F7 and F5 of FIG. 4 are skipped, and a video decoder may replace the frames F5 and F7 of the enhancement layer by the frames (A3u and A4u) generated by upsampling of A3 and A4.

FIG. 6 illustrates a case where base layers (A1 to A8) and enhancement layer frames (F1 to F8) are present, by way of example. In this case, a frame may first be truncated from the enhancement layer frames. However, it is desirable not to truncate an intra picture (I-picture) and a predictive picture (P-picture), which are used as reference frames of other frames, from the frames encoded in the closed-loop coding. In FIG. 6 when it is assumed that F1 is an I-picture, F5 is a P-picture and the other oblique frames are bidirectional pictures (B-pictures), and when it is necessary to truncate frames, only B-pictures may be truncated, starting from the later temporal frames.

In a bit-stream encoded with an open-loop coding method such as MCTF, a frame may be truncated without classifying frames into high-pass frames and low-pass frames. In the open-loop coding, since errors are distributed between the low-pass frames and the high-pass frames, the quality of the picture of the high-pass frames referencing the low-pass frames, whose picture quality is somewhat low, is not greatly degraded as compared to the closed-loop coding.

In FIG. 6, when it is necessary to truncate two frames, the two frames (F8 and F7), which are temporally later, are truncated. The reason why frames that are temporally later are truncated is to reduce the flicker due to a change in picture quality between frames. As in FIG. 7, when F3 and F7 are truncated and they are replaced by upsampled frames (A3u and A7u) of A3 and A7, flicker occurs four times. In the present invention, in order to reduce the flicker, those frames which are to be truncated are selected from adjacent frames. For this purpose, among the plurality of frames, frames that are temporally later are successively truncated.

Figure 8:
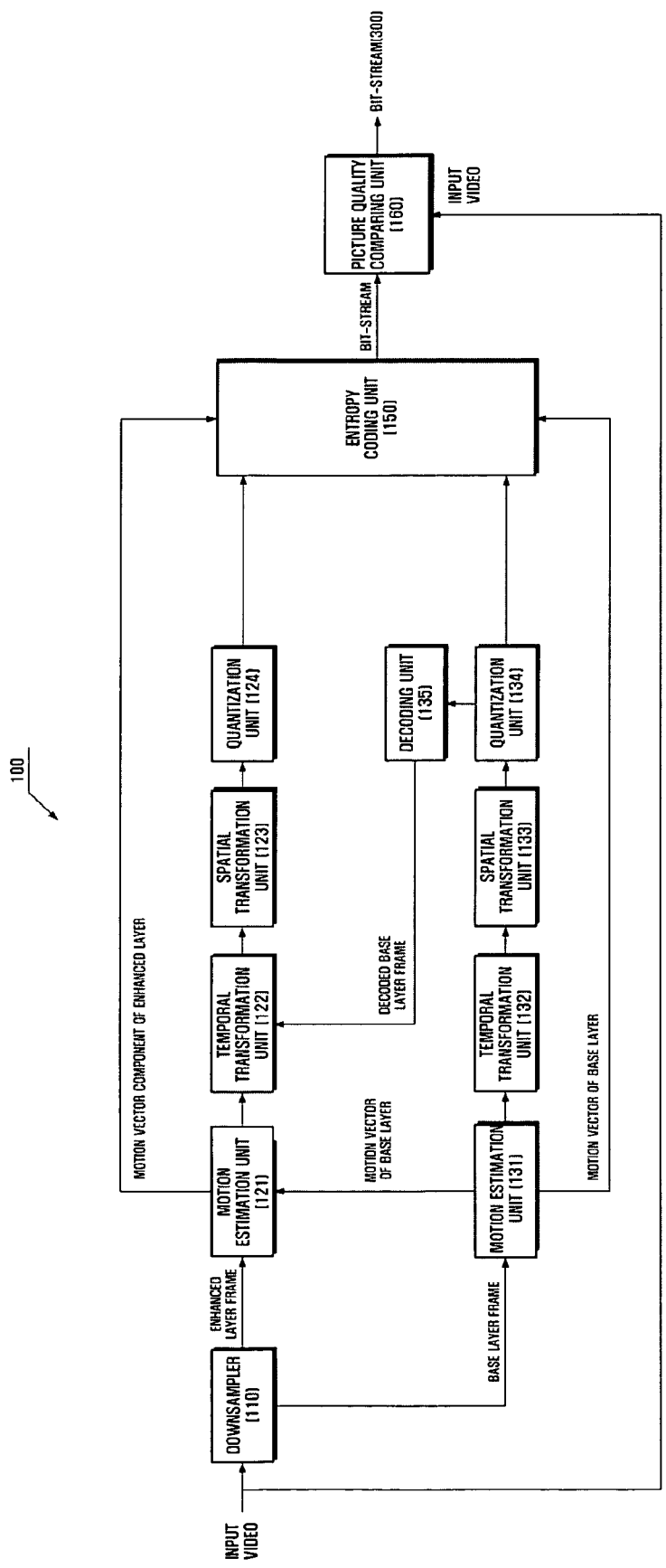
FIG. 8 illustrates a construction of a multi-layer video encoder according to an exemplary embodiment of the present invention.

A multi-layered video encoder 100 according to an exemplary embodiment of the present invention is as illustrated in FIG. 8. In this exemplary embodiment, a single base layer and a single enhancement layer are used by way of example. The video encoder 100 comprises a downsampler 110, motion estimation units 121 and 131, temporal transformation units 122 and 132, spatial transformation units 123 and 133, quantization units 124 and 134, a decoding unit 135, an entropy coding unit 150 and a picture quality comparing unit 160.

Figure 2:
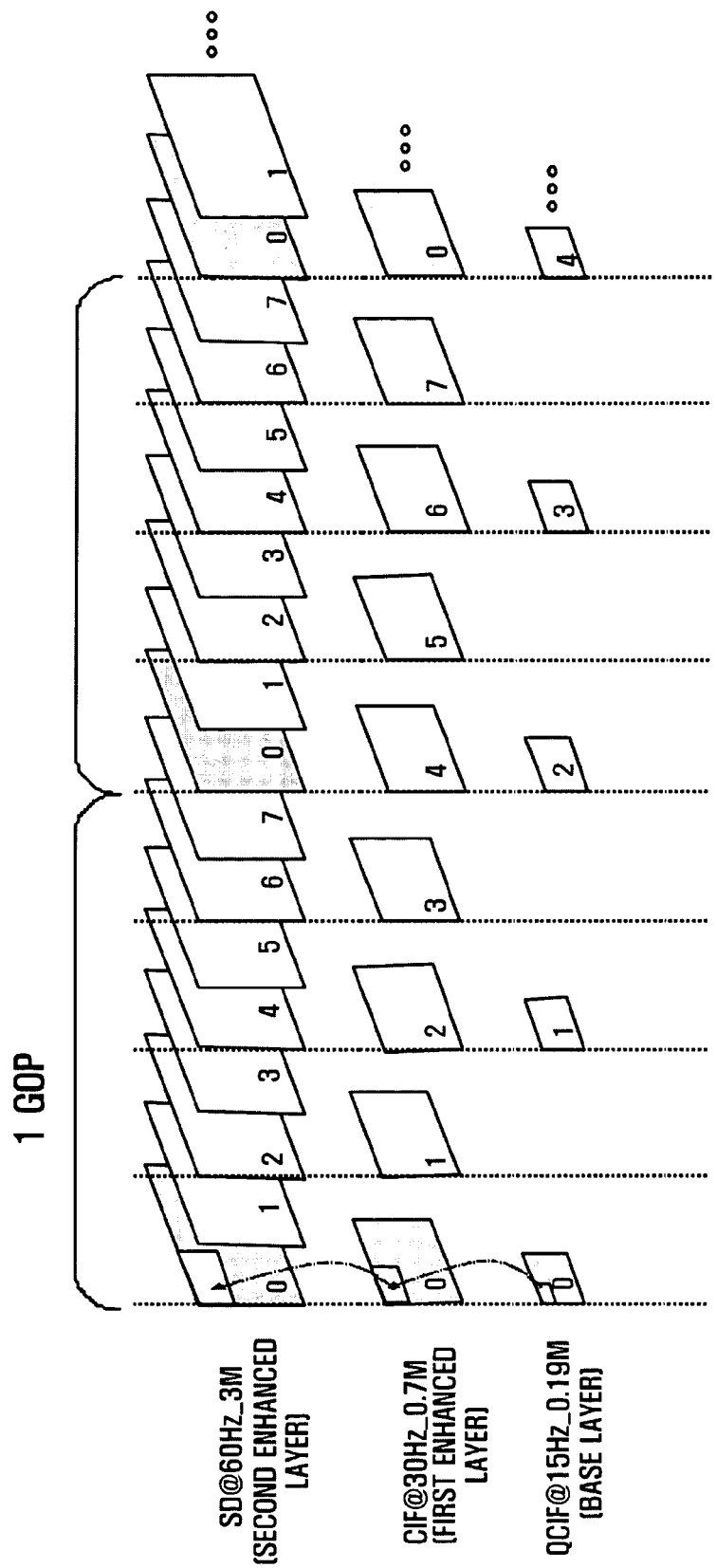
FIG. 2 illustrates an example of a frame array of a scalable video codec using a multi-layered structure.

The downsampler 110 downsamples an input video with a resolution and a frame rate adapted to each layer. As illustrated in FIG. 2, when a base layer of QCIF@15 Hz and an enhancement layer of CIF@30 Hz are used, an original input video is downsampled to QCIF and CIF separately, and the resultant videos are again downsampled at the frame rates of 15 Hz and 30 Hz, respectively. Downsampling of the resolution may be conducted by means of an MPEG downsampler or a wavelet downsampler, and downsampling of the frame rate may be conducted through frame skipping or frame interpolation.

The motion estimation unit 121 performs motion estimation with regard to an enhancement layer frame and obtains a motion vector of a base layer frame. Motion estimation is a process to search a reference frame for a block which is the most similar to a block of the current frame, that is, a block having the least errors. At this time, a variety of methods such as a fixed size block matching or a hierarchical variable size block matching (HVSBM) may be used. In this case, the motion vector component of the enhancement layer, from which redundancy is eliminated, can be represented most efficiently by use of the motion vector of the base layer frame obtained by the motion estimation unit 131.

The temporal transformation unit 122 constructs a prediction frame using the motion vector obtained by the motion estimation unit 121 and a frame at a position temporally different from the current frame, and obtains the difference between the current frame and the prediction frame to thereby reduce the temporal redundancy. As a result, a residual frame is generated. When the current frame is an intraframe that is encoded without reference to a different frame, it does not need a motion vector, and a temporal transmission using the prediction frame is also omitted. Among these temporal transformation methods, MCTF or UMCTF may be used to support the temporal scalability.

When an enhancement layer frame is an intraframe, a method of removing the redundancy of textures between layers by use of a base layer frame at the corresponding position may be used. In this case, the base layer frame having passed through the quantization unit 134 is restored by decoding the resultant frame again in the decoding unit 135, whereby the enhancement layer frame on the corresponding position can be efficiently predicted by use of the restored base layer frame (upsampled when necessary), which is called "B-intra prediction."

The spatial transformation unit 123 generates a transform coefficient by performing spatial transformation on the residual frame generated by the temporal transformation module 122 or on an original input frame. Here, DCT or wavelet spatial transformation is used for a method of spatial transformation. When DCT is used, the transform coefficient is a DCT coefficient, and it is a wavelet coefficient when the wavelet transformation is used.

The quantization unit 124 quantizes the transform coefficient generated by the spatial transformation unit 123 to thereby generate a quantization coefficient. At this time, the quantization unit 124 formats the quantization coefficient in order to support the SNR scalability. As a method to support the SNR scalability, FGS coding or embedded quantization may be used.

Figures 9, 10:
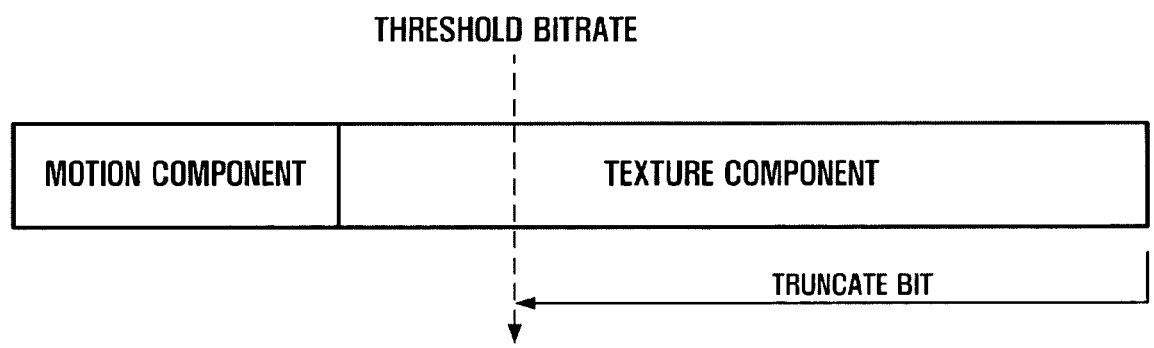
FIG. 9 illustrates an example of a discrete cosine transform (DCT) conversion of a differential coefficient.
FIG. 10 illustrates a threshold bitrate.

FGS coding will first be described. The difference between the original input frame and the decoded base layer frame is obtained, and the obtained difference is decomposed into a plurality of bit-planes. For example, assuming that a difference coefficient of a DCT block is as illustrated in FIG. 9 (In the 8×8 DCT block, the omitted portions are all indicated by "0s"), the difference coefficient can be arrayed as {+13, −11, 0, 0, +17, 0, 0, 0, −3, 0, 0, ...} when a zigzag scan is used, and it can be decomposed into five bit-planes as in Table 1. A value of a bit-plane is represented as a binary coefficient.

TABLE 1

| | \multicolumn{10}{c}{Value} |
|---|---|---|---|---|---|---|---|---|---|---|
| | +13 | −11 | 0 | 0 | +17 | 0 | 0 | 0 | −3 | 0... |
| Bit-plane 4 ($2^4$) | 0 | 0 | 0 | 0 | 1 | 0 | 0 | 0 | 0 | 0... |
| Bit-plane 3 ($2^3$) | 1 | 1 | 0 | 0 | 0 | 0 | 0 | 0 | 0 | 0... |
| Bit-plane 2 ($2^2$) | 1 | 0 | 0 | 0 | 0 | 0 | 0 | 0 | 0 | 0... |
| Bit-plane 1 ($2^1$) | 0 | 1 | 0 | 0 | 0 | 0 | 0 | 0 | 1 | 0... |
| Bit-plane 0 ($2^0$) | 1 | 1 | 0 | 0 | 1 | 0 | 0 | 0 | 1 | 0... |

The enhancement layer formatted into bit-planes decomposed as above starts from the 4th bit-plane (highest order) and is successively arrayed by each bit-plane unit to the 0th bit-plane (lowest order). To adjust the bitrate in the pre-decoder, the bit-plane having the lowest difference is first truncated, to thereby implement the SNR scalability. When the 4th bit-plane and the 3rd bit-plane are left after the other bit-planes have been truncated, the decoder side is sent the array: {+8, −8, 0, 0, 16, 0, 0, 0, 0, ...}.

Embedded quantization is appropriate for use in a wavelet-based codec. For example, only the values higher than a first threshold value are encoded and only the values higher than a new threshold value generated by halving the first threshold value are encoded, wherein this new threshold value is halved again and these operations are repeated. Unlike FGS, embedded quantization is conducted using the spatial correlation. Embedded quantization methods include the embedded zerotrees wavelet algorithm (EZW), embedded zeroblock coding (EZBC), and set partitioning in hierarchical trees (SPIHT).

When FGS coding or embedded quantization is applied to texture data of a frame, a user may truncate the texture data arbitrarily according to the situation, from the frame which is temporally later, in order to implement SNR scalability.

Referring to FIG. 8, like the enhancement layer frame, the base layer frame undergoes motion estimation by the motion estimation unit 131, temporal transformation by the temporal transformation unit 132, spatial transformation by the spatial transformation 133 and quantization by the quantization unit 134.

The entropy coding unit 150 generates an output bit-stream by conducting lossless coding (or entropy coding) on the quantization coefficient generated by the quantization unit 134 of the base layer and the quantization unit 124 of the enhancement layer, a motion vector of the base layer generated by the motion estimation unit 131 of the base layer, and a motion vector component of the enhancement layer generated by the motion estimation unit 121. For the lossless coding, a variety of coding methods such as Huffman coding, arithmetic coding or variable length coding may be used.

When a scalable bit-stream is generated through these processes, the pre-decoder may control the transmission bitrate by truncating the bit-stream of the current frame, starting from a later portion of the current frame, according to network conditions. However, when a considerable amount of the bit-stream is truncated because the network conditions degrade, the picture quality of the resulting video will be poor. In an extreme case, as the bit-stream of the current frame is truncated, the entire texture component in addition to the motion component may be truncated. Thus, when the bit-stream is truncated according to the network situation as in FIG. 10, if the target transmission bitrate is lower than a specific threshold bitrate, a better result may be produced if the entire bit-stream of the current frame is discarded and the current frame is restored by upsampling a lower layer frame corresponding thereto in the video decoder. A problem is how to seek such a threshold bitrate. Since the pre-decoder cannot determine where the picture quality is superior or inferior because no original input frame exists, the threshold value information must be determined and transmitted by the video encoder 100.

For this purpose, the video encoder 100 may further comprise a picture quality comparing unit 160. The picture quality comparing unit 160 compares an enhancement layer frame restored by decoding the texture component of the enhancement layer frame, a part of which is truncated, in the bit-stream generated by the entropy coding unit 150, with a frame generated by decoding a base layer frame temporally corresponding to the enhancement layer frame and upsampling it to the resolution of the enhancement layer. For quality comparison, the sums of the differences between a frame and the original frame may be compared, or Peak SNRs (PSNRs) obtained based on an original frame may be compared. As a result, if the picture quality of the restored enhancement layer frame is superior to that of the corresponding base layer frame, the texture component of the enhancement layer frame is further truncated, decoded and then another comparison is performed. Through repetition of these processes, the threshold bitrate to make both frames identical in picture quality (as depicted in FIG. 10) can be found. The picture quality comparing unit 160 may record the sought threshold bitrate as a marker bit on a bit-stream generated by the entropy coding unit 150.

Figure 11:
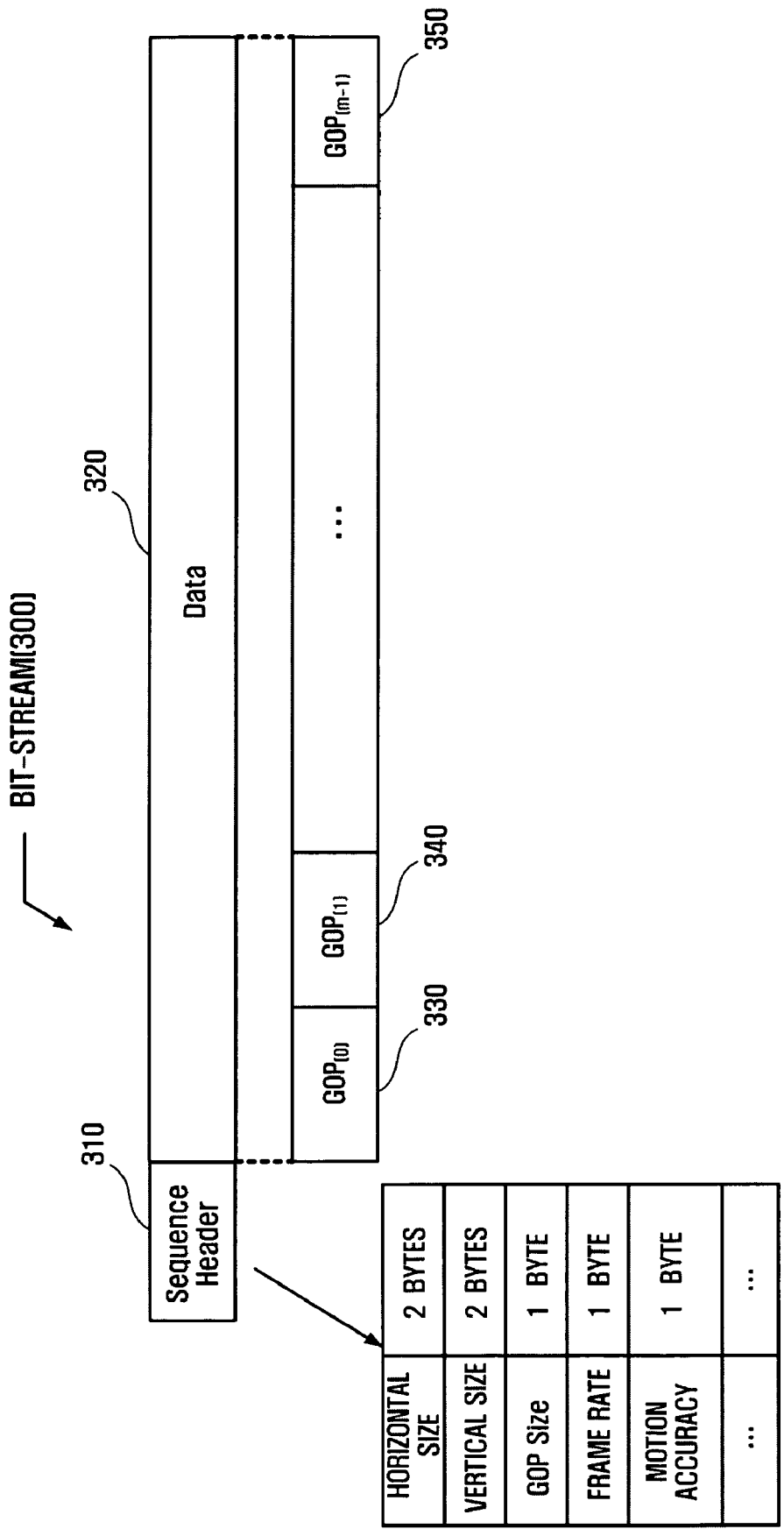
FIGS. 11 to 14 illustrate a structure of a bit-stream according to an exemplary embodiment of the present invention.

FIGS. 11 to 14 illustrate a construction of the bit-stream 300 shown in FIG. 8, according to an exemplary embodiment of the present invention. In particular, FIG. 11 schematically illustrates the overall construction of the bit-stream 300.

The bit-stream 300 consists of a sequence header field 310 and a data field 320. The data field 320 may comprise one or more GOP fields including 330, 340 and 350.

Properties of a video such as a width size (2 bytes) and a length size (2 bytes) of a frame, the size of a GOP (1 byte), the frame rate (1 byte), the motion accuracy (1 byte), and others are recorded in the sequence header field 310.

Figure 12:
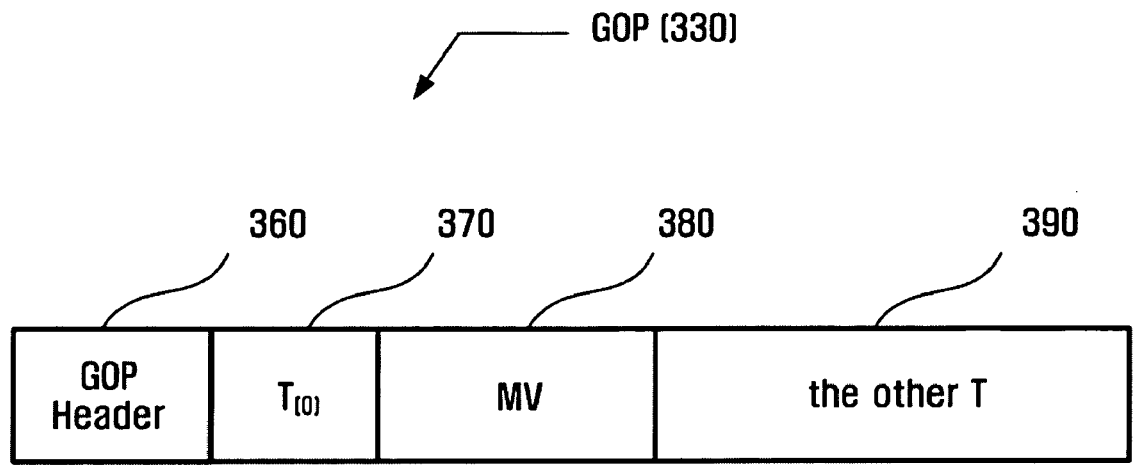

FIG. 12 illustrates a detailed structure of each GOP field 330. The GOP field 330 may comprise a GOP header 360, a T(0) field 370 in which information on a first frame (an intraframe) based on the first temporal filtering sequence is recorded, an MV field 380 in which a set of motion vectors is recorded, and a "the other T" field 390 in which information on other frames (interframes), excluding the first frame, are recorded.

Unlike the sequence header field 310, properties of a frame belonging to the current GOP, not those of the whole frame, are recorded in the GOP header field 360.

Figure 13:
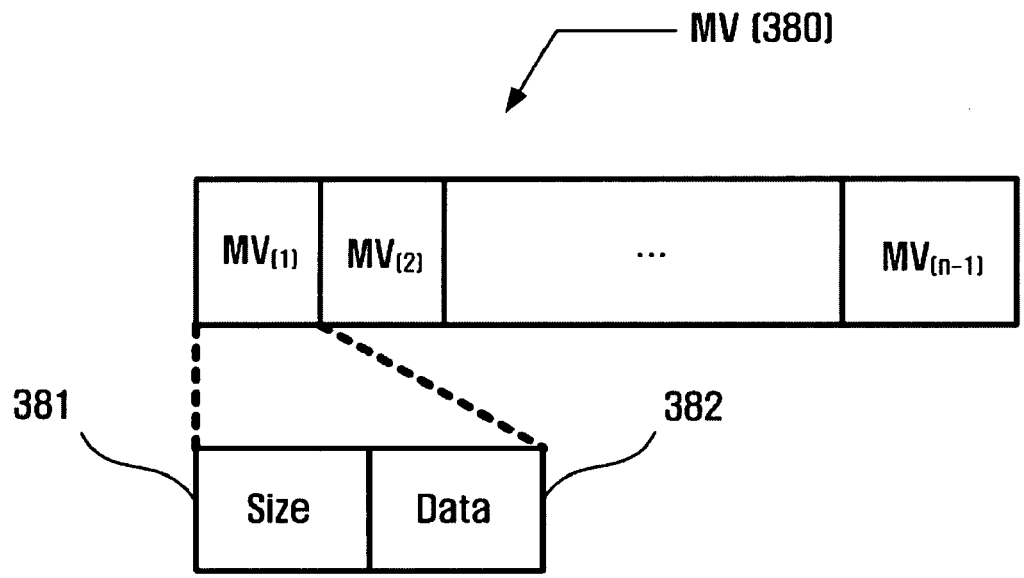

FIG. 13 illustrates a detailed structure of the MV field 380 where motion vectors are recorded. Each motion vector field includes a Size field 381 to represent the size of a motion vector and a Data field 382 to record actual data of the motion vector therein. The Data field 382 may be composed of a field (not shown) containing information on entropy coding and a binary stream field (not shown) containing actual motion vector information.

Figure 14:
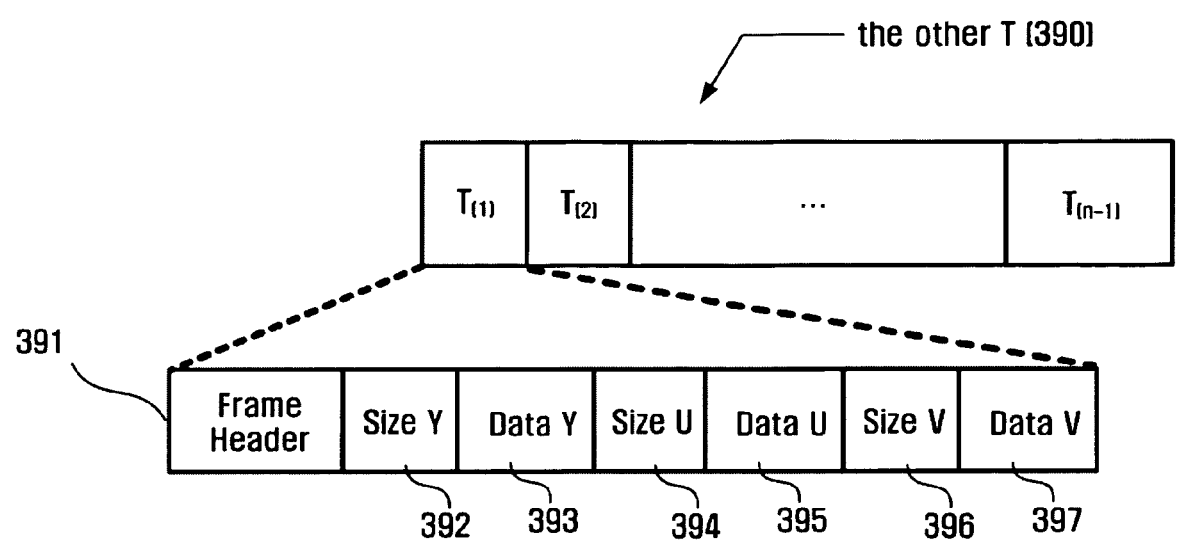

FIG. 14 illustrates a detailed structure of "the other T" field 390. For example, information on interframes, the number of which is one less than that of the frames, may be recorded in this field 390.

Information on each interframe comprises a frame header field 391, a Data Y field 393 to record a brightness component of the concerned interframe, a Data U field to record a blue color difference component, and a Data V 397 field to record a red color difference component. Size fields 392, 394 and 396 are attached to the front of each of the fields 393, 395 and 396 to represent the size of each component. In the frame header field 391 are recorded properties of the video confined to the concerned frame, unlike the sequence header field 310 and the GOP header field 360.

When a single frame consists a plurality of color components (including a brightness (Y) component), pre-decoding by each color component may be conducted, and the color components each constituting a frame may be pre-decoded with the same percentage. The threshold bitrate described with reference to FIG. 10 may be recorded in the frame header field 391 and transmitted to the pre-decoder. Instead of recording the threshold bit number in the frame header field 391, it may be indicated as a separate marker bit on a color component basis.

Figure 15:
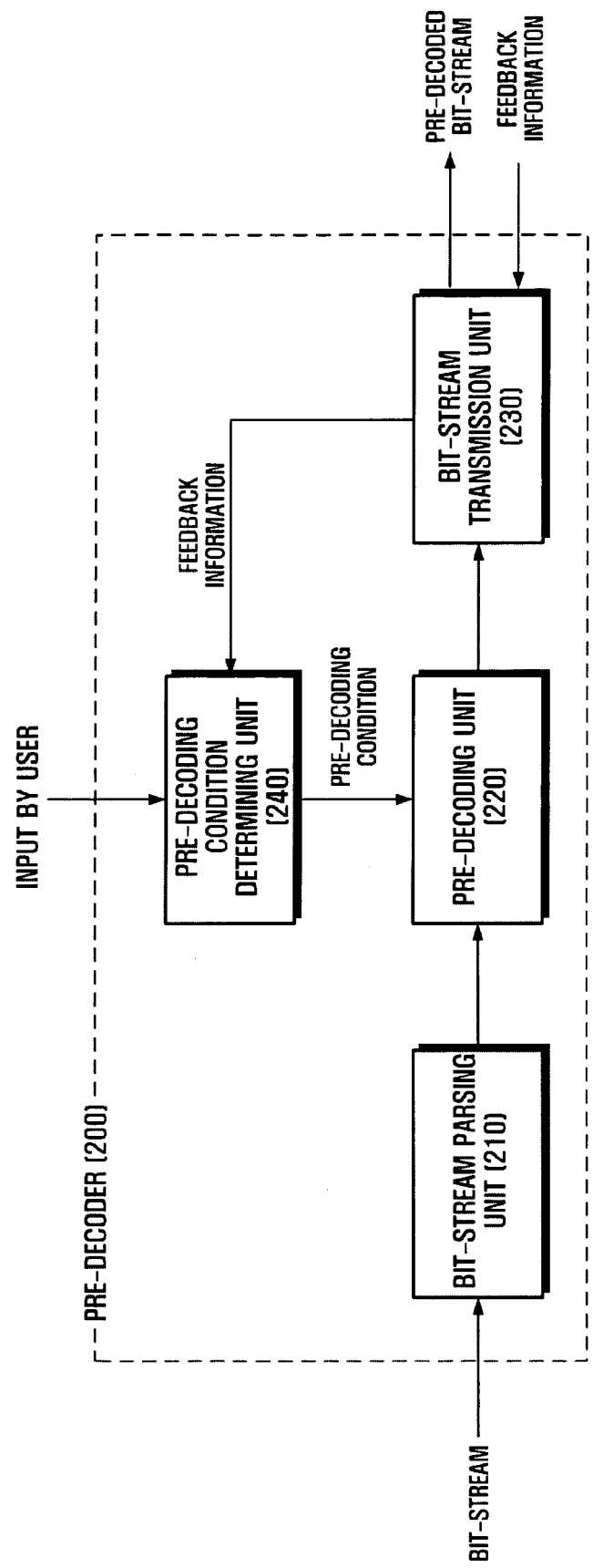
FIG. 15 illustrates a construction of a pre-decoder according to an exemplary embodiment of the present invention.

FIG. 15 illustrates a construction of a pre-decoder 200 according to an exemplary embodiment of the present invention. The pre-decoder 200 pre-decodes the bit-stream 300 provided from the video encoder 100 and controls the SNR or the bitrate of the bit-stream 300. Pre-decoding involves controlling the resolution, frame rate and SNR by extracting or truncating part of the bit-stream. However, since the present invention is focused on implementing SNR scalability, it can be understood that pre-decoding refers to controlling the SNR of a bit-stream hereinafter. In actual implementation, the pre-decoder 200 may be understood as a video stream server to transmit a scalable video stream adaptive to a variable network environment.

The pre-decoder 200 comprises a bit-stream parsing unit 210, a pre-decoding condition determining unit 240, a pre-decoding unit 220 and a bit-stream transmitting unit 230.

The bit-stream parsing unit 210 parses a bit-stream 300 supplied from the video encoder 100. In this case, it reads out a frame-based information included in the bit-stream 300, e.g., the frame header 391 of "the other T" field 390, data size information of each color component 392, 394 and 396 and texture information 393, 395 and 397 of FIG. 14.

According to input by a user, the pre-decoding condition determining unit 240 determines pre-decoding conditions, i.e., a target transmission bitrate, subject to a variable network situation. As an example of determining the pre-decoding conditions, currently available feedback information is fed back from the video decoder that received the bit-stream transmitted from the pre-decoder 200, on which basis the target transmission bitrate is determined. Here, the video decoder is an apparatus to restore a video stream, which may be understood as referring to a client device to receive the video streaming service.

The pre-decoding unit 220 pre-decodes the parsed bit-stream according to the determined target transmission bitrate. In the present invention, a first exemplary embodiment of pre-decoding of a bit-stream on a frame basis and a second exemplary embodiment of pre-decoding of a set of a predetermined number of frames, that is, pre-decoding on a unit basis will be described. The pre-decoding unit may be identical to or different from a GOP unit.

Figure 16:
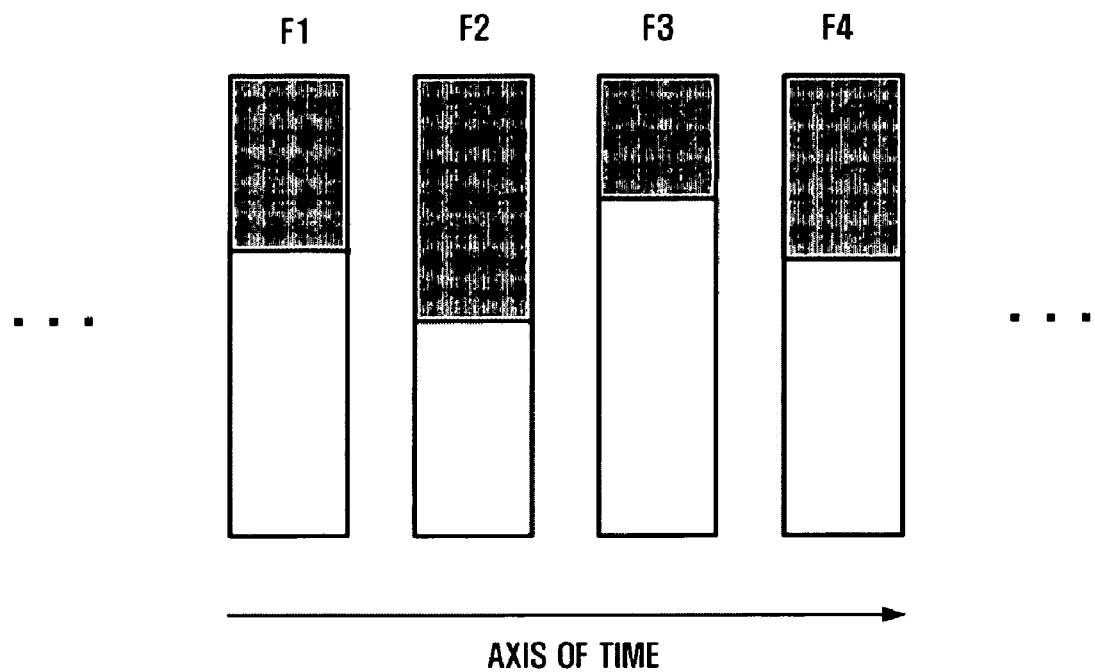
FIG. 16 is a block diagram illustrating an example of pre-decoding of each frame.

Pre-decoding on a frame basis is adaptive to a frame so that each frame has a variable bitrate according to a variable network situation. FIG. 16 is a diagram illustrating pre-decoding on a frame basis, where each of F1 through F4 indicates a frame component in the bit-stream, and the shaded portions indicate portions truncated from each frame by pre-decoding.

Figure 17:
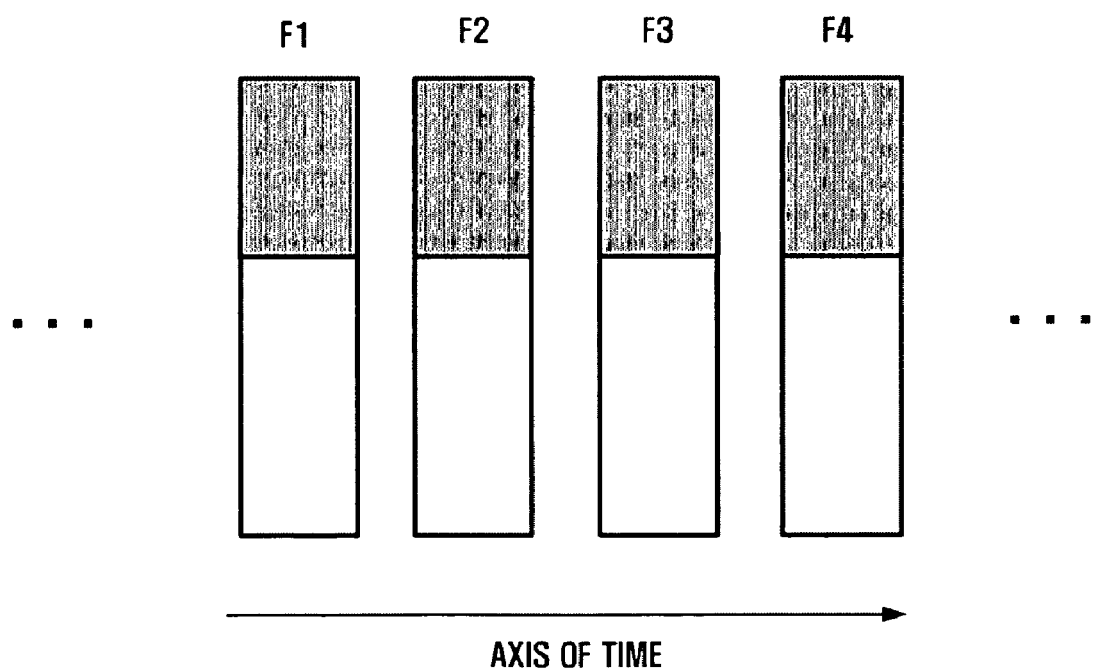
FIG. 17 is a block diagram illustrating an example of pre-decoding of each frame.

Pre-decoding on a unit basis determines a transmission bitrate for a plurality of frames. FIG. 17 is a diagram illustrating pre-decoding on a unit basis. When a pre-decoding unit consists of four frames, the same number of bits as in the variable pre-decoding result of FIG. 16 can be truncated as a whole. In this case, the period of reflecting a change in the network situation is lengthened as compared with transmission on a frame basis. The feedback period received from the video decoder side is lengthened accordingly.

For example, it is sufficient to truncate the same number of bits as the sum of the shaded parts of FIG. 16. For this purpose, uniform truncation may be conducted as in FIG. 17, or frames within the pre-decoding unit may be skipped.

Figure 18:
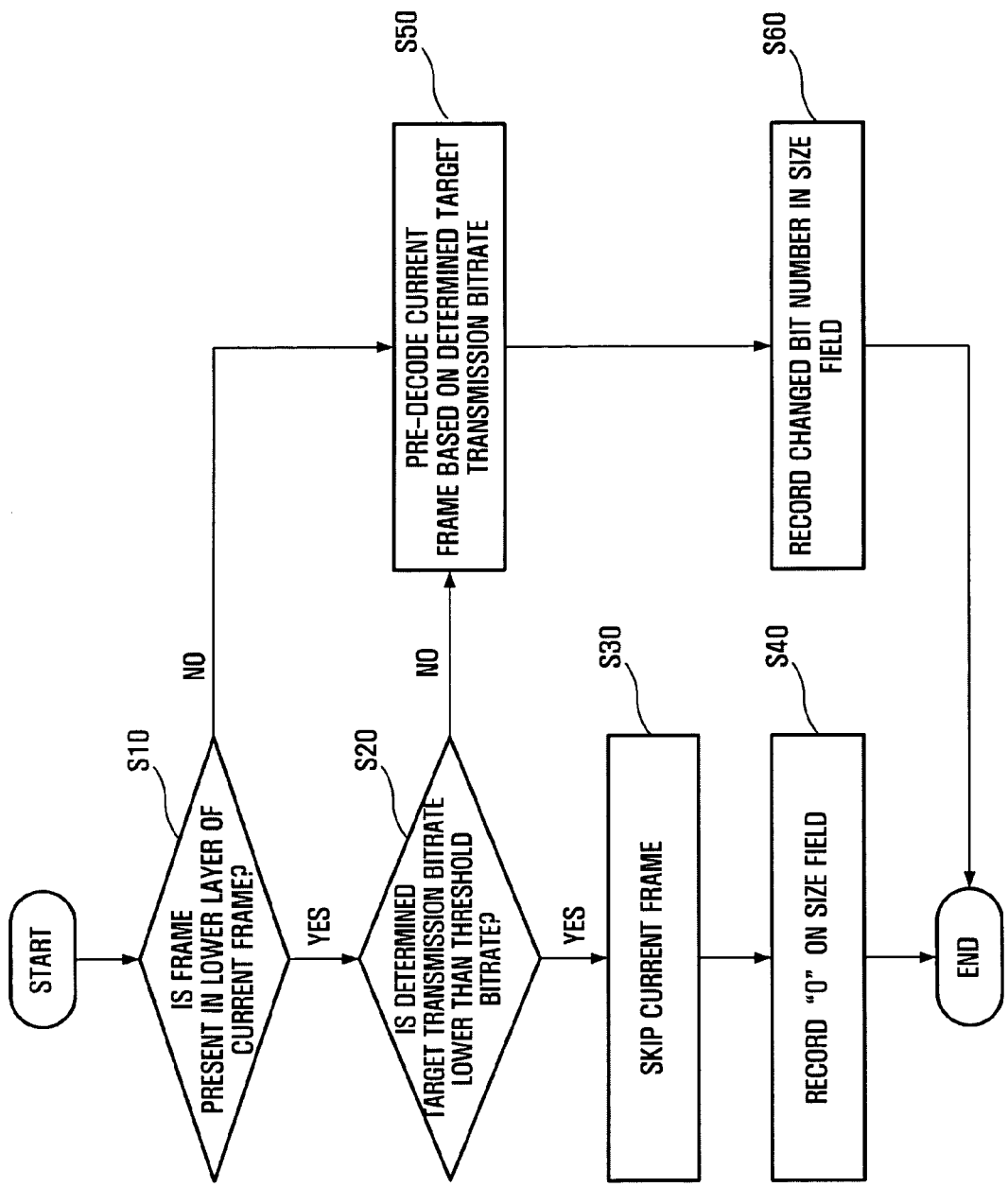
FIG. 18 is a flow chart illustrating operations conducted in a pre-decoder according to an exemplary embodiment of the present invention.

According to the first exemplary embodiment of the present invention, operations conducted by the pre-decoding unit 220 are as illustrated in the flow chart of FIG. 18. It is first determined whether a frame is present in a lower layer of the current frame (S10). If not present (No in S10), the current frame is pre-decoded according to pre-decoding conditions or a target transmission bitrate determined by the pre-decoding condition determining unit 240 (S50). In this case, since skipping of the current frame is not possible, the texture component of the current frame is truncated as much as possible in order to adjust the SNR. In the present invention, the current frame refers to a frame to be currently transmitted by the pre-decoder.

By recording the size of texture data left after truncation in the field to indicate the texture data size, the decoder side can know it later (S60). The pre-decoder 200 may conduct pre-decoding of the current frame based on color components (Y, U, and V) as illustrated in FIG. 14, and record the sizes of changed texture data in the color component size fields 392, 394 and 396 after pre-decoding. In this case, pre-decoding may be conducted on a color component basis at a variable rate or at the same rate according to the network situation.

In operation S10, when a frame is present in the lower layer of the current frame (Yes in S10), it is checked whether the target transmission bitrate determined by the pre-decoding condition determining unit 240 is less than a predetermined threshold bitrate (S20).

As a result of the checking operation in S20, if the target transmission bitrate is less than the threshold bitrate (Yes in S20), the pre-decoder 200 skips the current frame, in lieu of truncating a part of the texture component S30. Then, "0" is recorded in the field to indicate the texture data size, whereby it indicates that no specific texture data exists S40. However, if the result of checking is contrary in operation S20, step S50 is repeated.

Skipping of the current frame may imply that only the texture data of the current frame is skipped or both the texture data and motion data are skipped. In the former case, the video decoder restores the texture data of the current frame by upsampling the texture data of a base layer corresponding thereto, but uses a motion vector of the current frame as a motion vector for the inverse temporal transformation. In the latter case, the video decoder upsamples both the texture data and the motion data of the base layer frame, and restores the texture data and motion data of the current frame.

In the first exemplary embodiment, the threshold bitrate may be determined and transmitted by the picture quality comparing unit 160 of the video decoder. But, it may be determined by any unit. For example, a pre-decoder determines a specific rate between texture information and motion information with respect to a frame and truncates the texture information, whereby the bitrate when a ratio of the texture information to the motion information reaches a specific rate may be set as the threshold bitrate. The threshold bitrate may be determined in various ways as construed by those skilled in the art.

Figure 19:
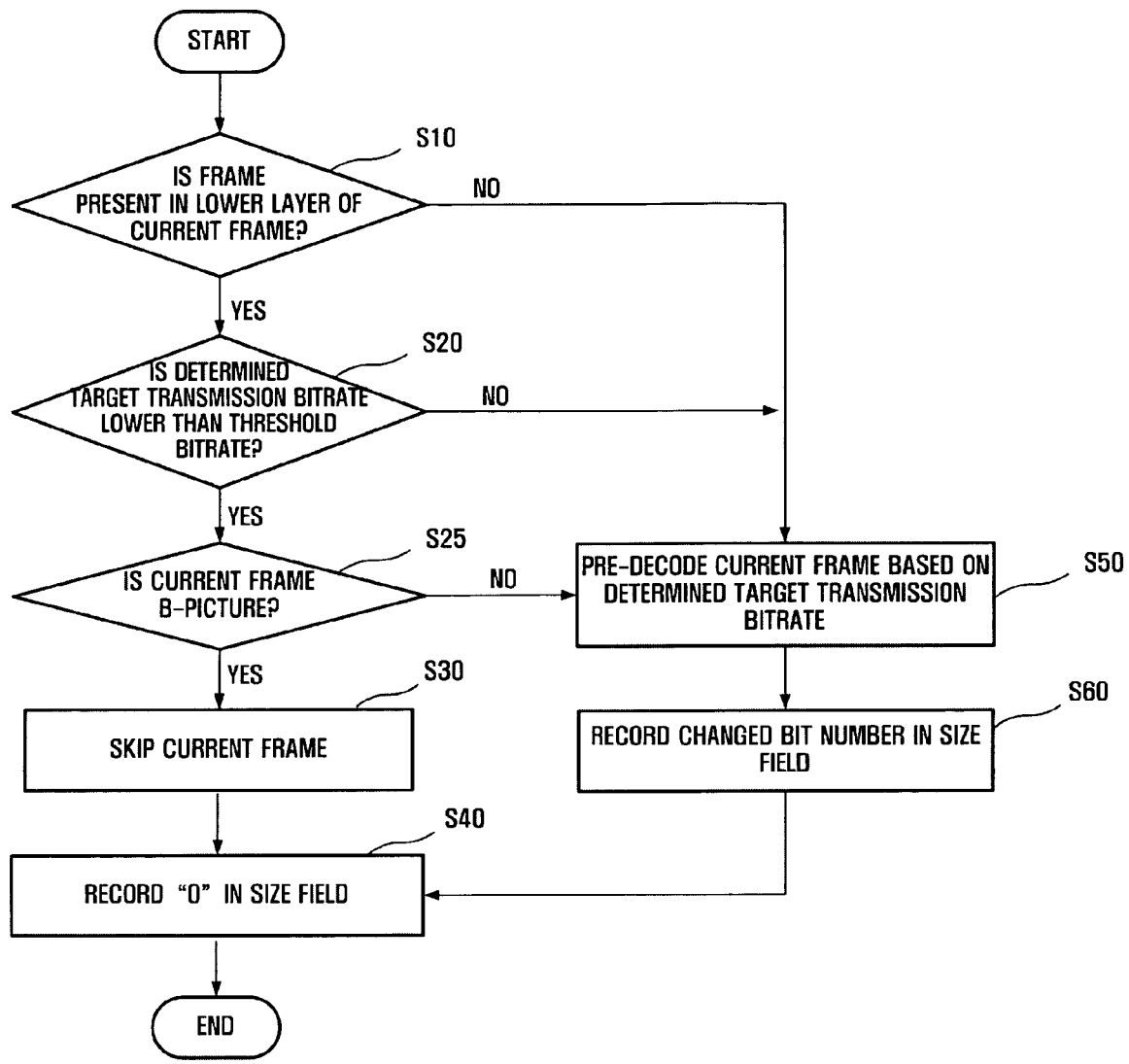
FIG. 19 is a flowchart illustrating operations conducted in a pre-decoder relative to a bit-stream encoded by a closed-loop mechanism.

When the video encoder 100 employs closed-loop coding, the pre-decoding may be performed in the sequence depicted in FIG. 19. FIG. 19 is different from FIG. 18 in that it further comprises a determination operation S25. In operation S25, when the current frame is a B-picture which is not used as a reference frame of other frames (Yes in S25), skipping of the current frame can be performed in S30 and S40. However, in operation S25, when the current frame is an I-picture or a P-picture which is used as a reference frame of another frame (No in S25), skipping of the current frame is not possible (S50 and S60). If some degree of degradation in picture quality can be acceptable, the method of FIG. 18 may be used when a lower layer frame is present, despite it being an open-loop coding method, regardless of whether the frame is an I-picture, B-picture or P-picture.

Figure 20:
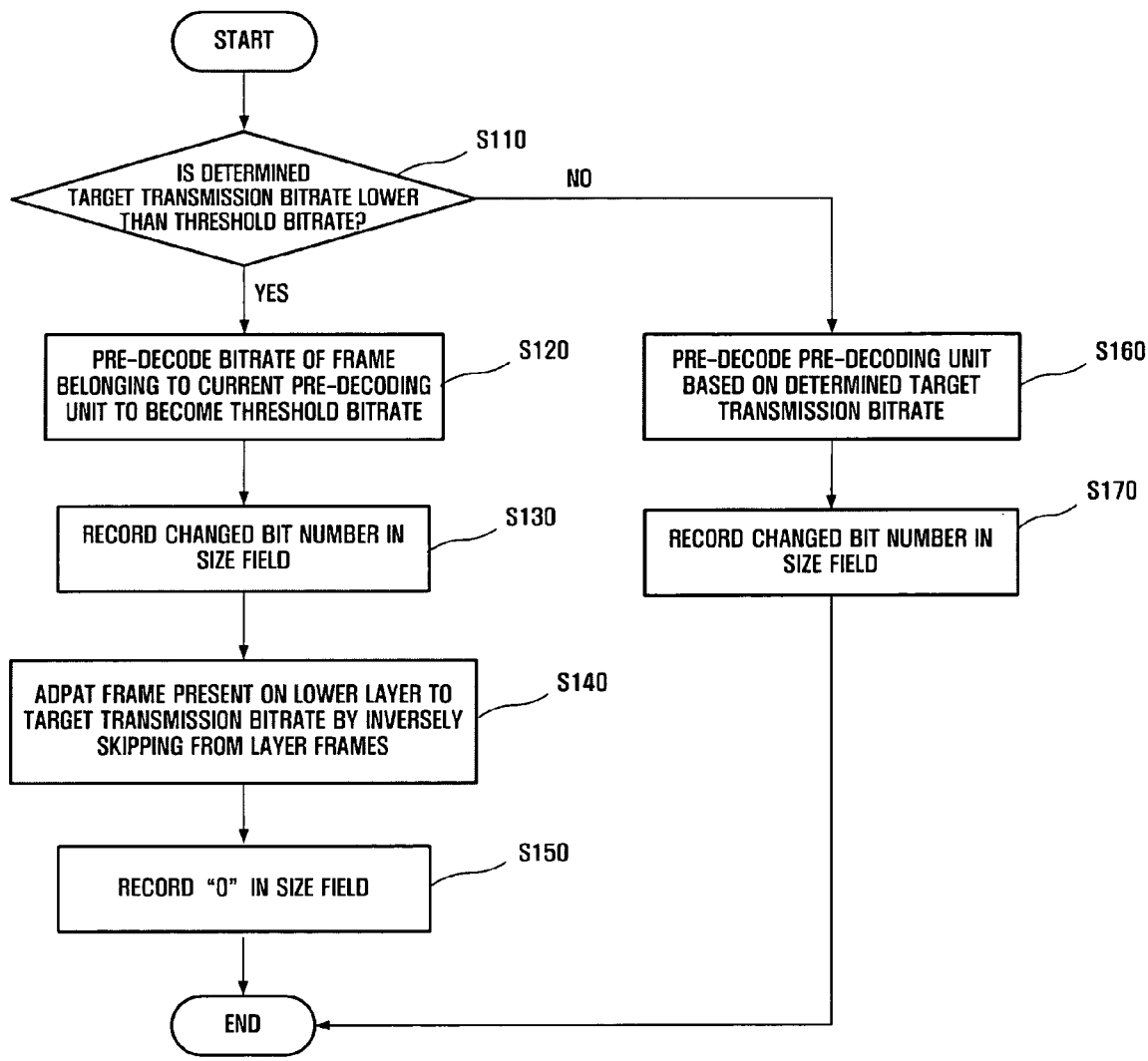
FIG. 20 is a flowchart illustrating operations conducted in a pre-decoder according to another exemplary embodiment of the present invention.

According to the second exemplary embodiment of the present invention, operations conducted by the pre-decoding unit 220 are as illustrated in FIG. 20. When a target transmission bitrate determined by the pre-decoding condition determining unit 240 is less than the threshold bitrate (Yes in S110), frames belonging to the pre-decoding unit are pre-decoded in order to have the threshold bitrate (S120). The changed bit numbers are recorded in the field to indicate the texture data size of each frame (S130). Since the threshold bitrate still exceeds the target transmission bitrate after the pre-decoding, frame skipping can be conducted thereafter.

The threshold bitrate is controlled so as to approach the target transmission bitrate by skipping the frames, whose lower layers are present, in the inverse order, among the frames belonging to the current pre-decoding unit (S140). Here, the current pre-decoding unit refers to a pre-decoding unit that the pre-decoder 200 currently transmits.

Figure 21:
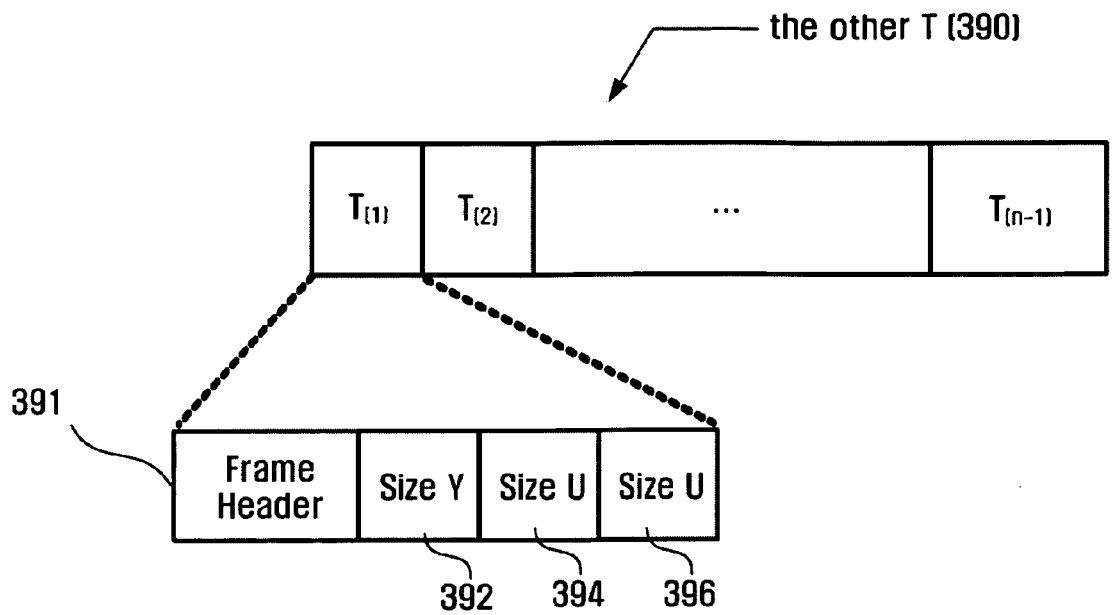
FIG. 21 illustrates a result after truncating texture data by frame skipping.

Then, "0" is recorded in the fields to indicate the texture data sizes of the skipped frames (S150). Although the frame is skipped, the frame header 391 and the size fields by color component 392, 394 and 396 are not removed. When the first frame is skipped in FIG. 14, the T(1) field of that frame includes only the frame header 391 and size fields by component 392, 394 and 396, as illustrated in FIG. 21. In this case, "0" is recorded in the size fields by component 392, 394 and 395.

Figure 22:
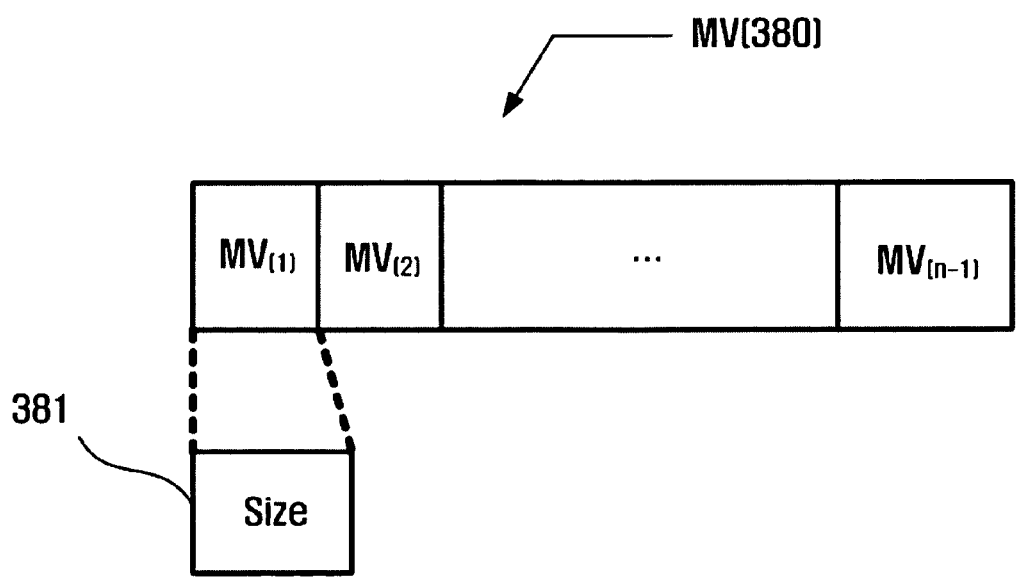
FIG. 22 illustrates a result after truncating motion information by frame skipping.

When a frame and a motion vector is skipped, the MV(1) field containing motion information on the first frame in FIG. 13 contains only the field 381 to indicate the size of motion vector as illustrated in FIG. 22. In this case, the field 381 is written with "0."

As a result of the determination in operation S10, when the determined target transmission bitrate is not less than the threshold bitrate (No in S110), a pre-decoding unit pre-decodes according to the target transmission bitrate (S160). As described with reference to FIG. 16, all the frames are not necessarily truncated in a uniform manner. It is not necessary that all frames be truncated evenly as long as the target transmission bitrate is satisfied. The changed bit numbers are recorded in the size fields of the respective frames (S170).

Returning to FIG. 15, the bit-stream transmission unit 230 transmits a bit-stream restructured by having its bitrate adjusted by the pre-decoding unit 220, that is, a pre-decoded bit-stream, to the video decoder side, and receives feedback information from the video decoder. The feedback information includes information on the currently available bitrate measured as the video decoder receives the bit-stream.

Figure 23:
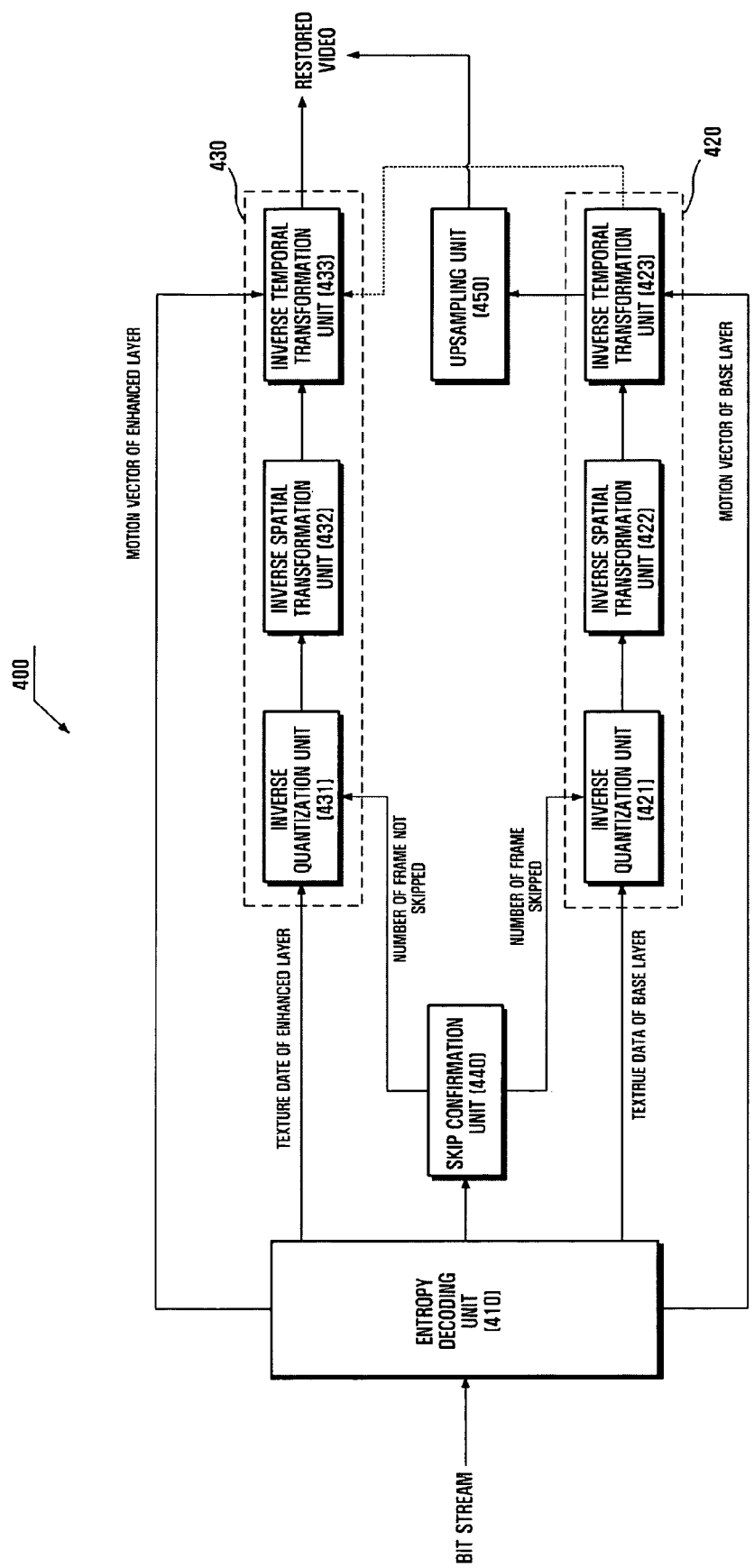
FIG. 23 illustrates a construction of a multi-layered video decoder according to an exemplary embodiment of the present invention.

FIG. 23 illustrates a construction of a multi-layered video decoder 400 according to an exemplary embodiment of the present invention. The video decoder 400 comprises an entropy decoding unit 410, a base layer decoder 420, an enhancement layer decoder 430, a skip confirmation unit 440, and an upsampling unit 450.

The entropy decoding unit 410 conducts inverse entropy coding operations, that is, it extracts data of a base layer frame and data of an enhancement layer from an input bit-stream. Each data of the base layer frame and the enhancement layer frame consists of texture data and motion data.

The skip confirmation unit 440 reads a field that indicates the size of texture data of the current frame among the enhancement layer frames. When the value is "0," indicating frame skipping, the number of the current skipped frame is provided to the base layer decoder 420. When the value is not "0," the number of the current frame is provided to the enhancement layer decoder 430. The current frame in the video decoder 400 of the present invention refers to a frame of a layer that is to be currently restored.

When the value indicates frame skipping, the base layer decoder 420 restores a lower layer frame having the identical temporal position as the current frame having the provided frame number. When the value does not indicate frame skipping, the enhancement layer decoder 430 restores the current frame from the texture data equivalent to the value.

The enhancement layer decoder 430 comprises an inverse quantization unit 431, an inverse spatial transformation unit 432 and an inverse temporal transformation unit 433. The inverse quantization unit 431 inversely quantizes texture data provided from the skip confirmation unit 440. This inverse quantization is an inversion of the quantization conducted in the video encoder 100. In this inverse quantization, the quantization table used in the quantization is also used as it is, to restore a transform coefficient. The quantization table may be transmitted from the encoder side, or it may be determined in advance by the encoder and the decoder.

The inverse spatial transformation unit 432 conducts an inverse spatial transformation on the inversely-quantized result. The inverse spatial transformation corresponds to spatial transformation conducted in the video encoder 100. Specifically, an inverse DCT transformation or an inverse wavelet transformation may be used.

The inverse temporal transformation unit 433 restores a video sequence from the inversely-spatial transformation result. In this case, an estimation frame is generated by use of a motion vector of an enhancement layer provided by the entropy decoding unit 410 and the already restored video frame, and the current frame is restored by adding the inverse-spatial transformation result and the generated estimation frame. Naturally, an intraframe not transformed temporally by the encoder has no need to pass through inverse temporal transformation.

However, according to an encoding method, the intraframe may also remove redundancy of texture of an enhancement layer by use of the base layer when encoding. In this case, the inverse temporal transformation unit 433 can restore the current frame, which is an intraframe, by use of the restored base layer frame.

Likewise, texture data of the base layer may be restored to a base layer frame by passing through the inverse quantization unit 421, the inverse spatial transformation unit 422 and the inverse temporal transformation unit 423. It has been described that the base layer decoder 420 and the enhancement layer decoder 430 are logically separate. However, it is obvious to those skilled in the art that a single decoding module can be implemented to restore both the enhancement layer and the base layer.

With respect to a frame corresponding to the number of a skipped frame provided from the skip confirmation unit 440, the upsampling unit 450 upsamples the restored base layer frame at the resolution of the enhancement layer. The frame generated as a result of upsampling becomes an enhancement layer frame having the number of the concerned frame. This upsampling may be conducted when the resolution of the base layer and that of the enhancement layer are different, but it can be deleted when both have the same resolution.

All of the exemplary embodiments of the present invention have been described with reference to a case where a frame has a single base layer and a single enhancement layer. However, those skilled in the art may sufficiently work from the above description other cases where many more layers are added. In case of a multi-layer consisting of a base layer, a first enhancement layer and a second enhancement layer, an algorithm used between the base layer and the first enhancement layer will likewise apply between the first enhancement layer and the second enhancement layer.

All the elements illustrated in FIGS. 8, 15 and 23 may refer to software units or hardware units such as a field programmable gate array (FPGA) or an application-specific integrated circuit (ASIC). However, these elements are not limited thereto, and they may be in addressable storage media or they may execute one or more processors. Those functions inherently provided by these elements may be further broken down, or a single element to execute a specific function may be implemented by integrating a plurality of elements.

According to the present invention, adaptive reaction to variable network situations is possible when conducting pre-decoding.

The present invention may also be utilized when only truncation of texture information of a frame of a layer makes it not possible to approach a target transmission bitrate.

It will be understood by those of ordinary skill in the art that various replacements, modifications and changes in form and details may be made without departing from the spirit and scope of the present invention as defined by the following claims. Therefore, it is to be appreciated that the above described embodiment are for purposes of illustration only and are not to be construed as limitations of the invention.

What is claimed is:

1. An apparatus for adapting a bitrate of an input bit-stream, comprising multi-layers, to a variable network environment, the apparatus comprising:
    a processor;
    a bit-stream parsing unit which parses the input bit-stream, under control of the processor;
    a pre-decoding condition determining unit which determines a target transmission bitrate according to the variable network environment, under control of the processor;
    a pre-decoding unit which, under control of the processor, selectively performs one of an operation of skipping at least one frame among a plurality of frames of an enhancement layer of the multi-layers included in the input bit-stream, and an operation of truncating a portion of the at least one frame of the plurality of frames of the enhancement layer, according to the target transmission bitrate, thereby generating an output bit-stream; and
    a bit-stream transmission unit which transmits to a client device the output bit-stream, under control of the processor.

2. The apparatus of claim 1, wherein the pre-decoding condition determining unit determines the target transmission bitrate based on currently available bitrate information fed back to the pre-decoding condition determining unit from the client device.

3. The apparatus of claim 1, wherein, in the operation of skipping, the pre-decoding unit skips the at least one frame among the plurality of frames of the enhancement layer if the target transmission bitrate is less than a threshold bitrate.

4. The apparatus of claim 3, wherein the pre-decoding unit performs the operation of skipping the at least one enhancement layer frame, if at least one frame temporally corresponding to the at least one enhancement layer frame is present in a layer lower that the enhancement layer among the multi-layers in the input bit-stream, and
    wherein the at least one frame in the lower layer has a lower frame-rate or a lower pixel resolution than the at least one frame in the enhancement layer.

5. The apparatus of claim 4, wherein the pre-decoding unit performs the operation of skipping the at least one enhancement layer frame if the at least one enhancement layer frame is not used as a reference frame of another frame in frame prediction.

6. The apparatus of claim 1, wherein, if the pre-decoding unit performs the operation of skipping the at least one enhancement layer frame, the pre-decoding unit records "0" in a field included in each of the skipped at least one enhancement layer frame to indicate a size of texture data of the each of the skipped at least one enhancement layer frame.

7. An apparatus for adapting a bitrate of an input bit-stream, comprising multi-layers, to a variable network environment, the apparatus comprising:
    a processor;
    a bit-stream parsing unit which parses the input bit-stream, under control of the processor;
    a pre-decoding condition determining unit which determines a target transmission bitrate according to the variable network environment, under control of the processor;

a pre-decoding unit which, under control of the processor, skips at least one frame among a plurality of frames of an enhancement layer of the multi-layers included in the input bit-stream according to the target transmission bitrate, thereby generating an output bit-stream; and a bit-stream transmission unit which transmits to a client device the output bit-stream, under control of the processor, wherein the pre-decoding unit skips the at least one frame among the plurality of frames of the enhancement layer if the target transmission bitrate is less than a threshold bitrate, and wherein the threshold bitrate is provided from a video encoder that generates the input bit-stream.

8. The apparatus of claim 7, wherein the threshold bit rate is obtained at the video encoder by comparing a frame of the enhancement layer, decoded by decoding a texture component of the enhancement layer frame, a part of which is truncated, with a frame of a base layer of the multi-layers that temporally corresponds to the enhancement layer frame, and is decoded and upsampled at a pixel resolution of the enhancement layer, and wherein, as a result of the comparing, the threshold bitrate is determined by a bitrate when both of the enhancement layer frame and the base layer frame have a substantially same picture quality.

9. The apparatus of claim 7, wherein the threshold bitrate refers to a bitrate when a size ratio of a texture component to a motion component is a specific value according to truncation of the texture component.

10. An apparatus for adapting a bitrate of an input bit-stream, comprising multi-layers, to a variable network environment, the apparatus comprising:

a processor;

a bit-stream parsing unit which parses the input bit-stream, under control of the processor;

a pre-decoding condition determining unit which determines a target transmission bitrate according to the variable network environment, under control of the processor;

a pre-decoding unit which, under control of the processor, skips at least one frame among a plurality of frames of an enhancement layer of the multi-layers included in the input bit-stream according to the target transmission bitrate, thereby generating an output bit-stream; and a bit-stream transmission unit which transmits to a client device the output bit-stream, under control of the processor, wherein the pre-decoding unit skips the at least one frame among the plurality of frames of the enhancement layer if the target transmission bitrate is less than a threshold bitrate, and wherein the pre-decoding unit skips the at least one frame, in an inverse order starting from a last frame included in a current pre-decoding unit of the plurality of frames of the enhancement layer.

11. A video decoder for decoding an input bit-stream, comprising multi-layers, the video decoder comprising:

a processor;

a skip confirmation unit which, under control of the processor, confirms whether a frame of an enhancement layer among the multi-layers has been skipped by reading out a value of a field of the enhancement layer frame that indicates a texture data size of the enhancement layer frame from the input bit-stream;

a base layer decoder which, under control of the processor, restores a frame of a base layer having a temporal position corresponding to a temporal position of the enhancement layer frame if the value indicates that the enhancement layer frame has been skipped; and an upsampling unit which upsamples the restored base layer frame to a pixel resolution of the enhancement layer, under control of the processor.

12. The video decoder of claim 11, further comprising an enhancement layer decoder which restores the enhancement layer frame from texture data corresponding to the value, if the value does not indicate that the enhancement layer frame has been skipped.

13. The video decoder of claim 11, wherein the value to indicate that the enhancement layer frame has been skipped is "0".

14. A method of adapting a bitrate of an input bit-stream, comprising multi-layers, to a variable network environment using an apparatus comprising a processor, a parsing unit, a condition determining unit, a pre-decoding unit and a transmission unit, the method comprising:

parsing the input bit-stream by the parsing unit under control of the processor;

determining a target transmission bitrate according to the variable network environment by the condition determining unit under control of the processor;

selectively performing, by the pre-decoding unit under control of the processor, one of an operation of skipping at least one frame among a plurality of frames of an enhancement layer of the multi-layers included in the input bit-stream, and an operation of truncating a portion of the at least one frame of the plurality of frames of the enhancement layer, according to the target transmission bitrate, thereby generating an output bit-stream; and transmitting, by the transmission unit under control of the processor, to a client device the output bit-stream.

15. The method of claim 14, wherein the operation of skipping is performed if the target transmission bitrate is less than a threshold bitrate.

16. A method of adapting a bitrate of an input bit-stream, comprising multi-layers, to a variable network environment using an apparatus comprising a processor; a parsing unit, a condition determining unit, a pre-decoding unit and a transmission unit, the method comprising:

parsing the input bit-stream by the parsing unit under control of the processor;

determining a target transmission bitrate according to the variable network environment, by the condition determining unit under control of the processor;

skipping, by the pre-decoding unit under control of the processor, at least one frame among a plurality of frames of an enhancement layer of the multi-layers included in the input bit-stream according to the target transmission bitrate, thereby generating an output bit-stream; and transmitting to a client device the output bit-stream, by the transmission unit under control of the processor, wherein the skipping is performed by skipping the at least one frame among the plurality of frames of the enhancement layer if the target transmission bitrate is less than a threshold bitrate, and wherein the threshold bitrate is provided from a video encoder that generates the input bit-stream.

17. The method of claim 16, wherein the skipping the at least one frame among the plurality of frames of the enhancement layer is performed, if a frame temporally corresponding to the enhancement layer frame is present in a layer lower than the enhancement layer among the multi-layers in the input bit-stream.

18. A video decoding method for decoding an input bit-stream, comprising multi-layers, using a video decoder comprising a processor, a skip confirmation unit, a base layer decoder and an upsampling unit, the method comprising:

confirming, by the skip confirmation unit under control of the processor, whether a frame of an enhancement layer among the multi-layers has been skipped by reading out a value of a field of the enhancement layer frame that indicates a texture data size of the enhancement layer frame from the input bit-stream;

restoring, by the base layer decoder under control of the processor, a frame of a base layer having a temporal position corresponding to a temporal position of the enhancement layer frame if the value indicates that the enhancement layer frame has been skipped; and upsampling the restored base layer frame to a pixel resolution of the enhancement layer, by the unsampling unit under control of the processor.

19. The method of claim 18, further comprising restoring the enhancement layer frame from texture data corresponding to the value, if the value does not indicate that the enhancement layer frame has been skipped.

20. The method of claim 18, wherein the value to indicate that the enhancement layer frame has been skipped is "0".

* * * * *